United States Patent
Yu

(10) Patent No.: US 10,979,492 B2
(45) Date of Patent: Apr. 13, 2021

(54) METHODS AND SYSTEMS FOR LOAD BALANCING

(71) Applicant: ZHEJIANG DAHUA TECHNOLOGY CO., LTD., Zhejiang (CN)

(72) Inventor: Peng Yu, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 16/556,244

(22) Filed: Aug. 30, 2019

(65) Prior Publication Data

US 2019/0394264 A1    Dec. 26, 2019

Related U.S. Application Data

(63) Continuation of application No. PCT/CN2018/078101, filed on Mar. 6, 2018.

(30) Foreign Application Priority Data

Mar. 6, 2017  (CN) .......................... 201710129013.2

(51) Int. Cl.
*H04L 29/08* (2006.01)
*H04L 12/26* (2006.01)
(Continued)

(52) U.S. Cl.
CPC .......... *H04L 67/1008* (2013.01); *H04L 43/08* (2013.01); *H04L 67/1097* (2013.01); *H04N 5/247* (2013.01); *H04N 7/181* (2013.01)

(58) Field of Classification Search
USPC ....................................................... 709/224
See application file for complete search history.

(56) References Cited

U.S. PATENT DOCUMENTS

| 2002/0087675 A1 | 7/2002 | Yoshii et al. |
| 2009/0047004 A1* | 2/2009 | Johnson ............. H04N 21/4312 386/224 |

(Continued)

FOREIGN PATENT DOCUMENTS

| CN | 101140528 A | 3/2008 |
| CN | 102035737 A | 4/2011 |

(Continued)

OTHER PUBLICATIONS

The Extended European Search Report in European Application No. 18763844.0 dated Jan. 22, 2020, 10 pages.

(Continued)

*Primary Examiner* — James A Edwards
(74) *Attorney, Agent, or Firm* — Metis IP LLC

(57) ABSTRACT

A system and method for balancing loads during a distribution of a video capturing task. The method may comprise determining first time information related to when a first video capturing task is to be executed, and determine a second plurality of video capturing devices from a first plurality of video capturing devices to distribute the first video capturing task. The method may also comprise, for each of the second plurality of video capturing devices, determining second time information related to when at least one second video capturing task is to be executed by the video capturing device. The method may further comprise determining, based on the first time information and the second time information, a target video capturing device from the second plurality of video capturing devices, and assigning the first video capturing task to the target video capturing device.

20 Claims, 10 Drawing Sheets

(51) Int. Cl.
*H04N 5/247* (2006.01)
*H04N 7/18* (2006.01)

(56) References Cited

U.S. PATENT DOCUMENTS

| | | | |
|---|---|---|---|
| 2011/0099403 A1 | 4/2011 | Miyata et al. | |
| 2013/0235209 A1* | 9/2013 | Lee .................... | H04N 9/8211 348/159 |
| 2013/0315567 A1* | 11/2013 | Narayanan ......... | H04N 21/2404 386/265 |
| 2017/0019581 A1* | 1/2017 | Calvarese .......... | H04N 5/23206 |
| 2017/0264925 A1* | 9/2017 | Milne ................ | H04N 21/4353 |

FOREIGN PATENT DOCUMENTS

| CN | 101365119 B | 2/2013 | |
| CN | 103428102 A | 12/2013 | |
| CN | 104202770 A | 12/2014 | |
| CN | 105516369 A | 4/2016 | |
| EP | 2031824 A2 | 3/2009 | |
| KR | 20130124757 A | * 11/2013 | ....... H04N 21/23103 |
| KR | 20130124757 A | 11/2013 | |
| WO | 2018161884 A1 | 9/2018 | |

OTHER PUBLICATIONS

International Search Report in PCT/CN2018/078101 dated Jun. 1, 2018, 4 Pages.
Written Opinion in PCT/CN2018/078101 dated Jun. 1, 2018, 5 Pages.
First Office Action for Chinese Application No. 201710129013.2 dated Apr. 24, 2019, 13 pages.
Second Office Action for Chinese Application No. 201710129013.2 dated Apr. 16, 2019, 13 pages.

* cited by examiner

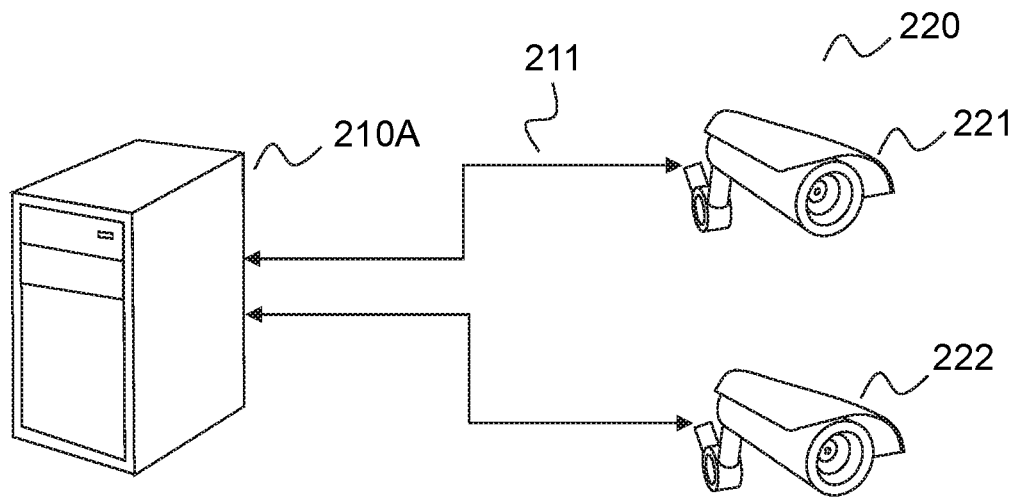
Video capturing device 200A
FIG. 2-A
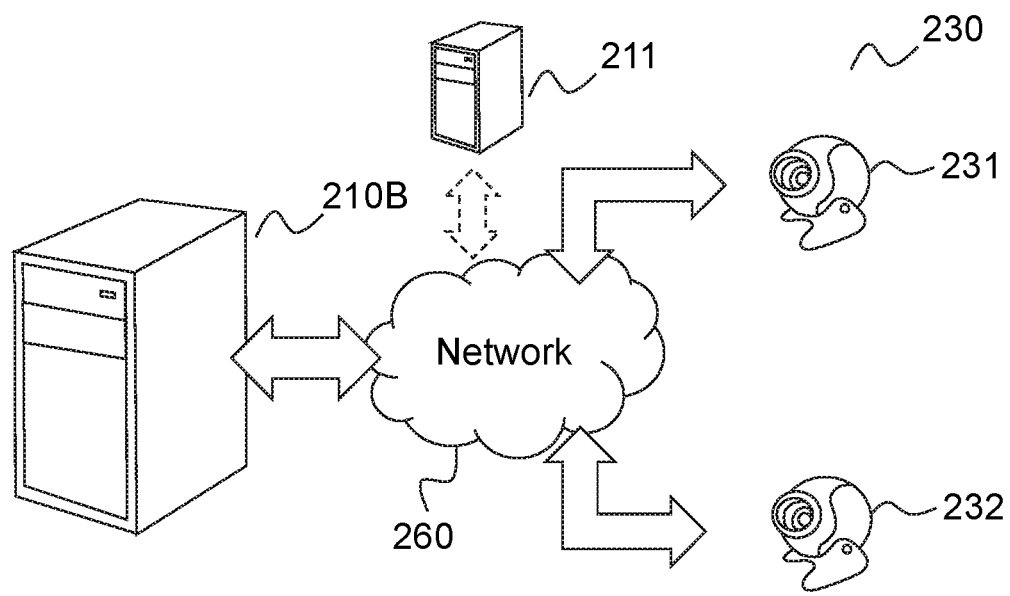
Video capturing device 200B
FIG. 2-B

METHODS AND SYSTEMS FOR LOAD BALANCING

CROSS REFERENCE

This application is a continuation of International Application No. PCT/CN2018/078101, filed on Mar. 6, 2018, which claims priority of Chinese Application No. 201710129013.2 filed on Mar. 6, 2017. The entire contents of the above-referenced applications are hereby incorporated by reference.

TECHNICAL FIELD

The present disclosure generally relates to a method and apparatus of a video capturing system that effectively balancing workloads among a plurality of video capturing devices in the system, and thereby increasing video capturing efficiency of the entire system while reducing workloads of some heavily loaded video capturing devices in the system.

BACKGROUND

A video cloud storage system is a system for capturing videos based on the user's shooting needs, and for storing the obtained videos. The video cloud storage system may include a management server, multiple node servers, and a cloud storage device. The management server may distribute video capturing tasks to the node servers. A node server may direct one or more cameras to capture a corresponding video according to the shooting time slot recorded in the video capturing task, and the video may be transmitted to the cloud storage device for storage through the network.

So far, the management server generally adopts the following two techniques when distributing a video capturing task. Technique 1: After distributing a first to-be-distributed video capturing task to a node server, the management server distributes a second to-be-distributed video capturing task to the next node server according to a preset order. Technique 2: Each time the management server distributes a video capturing task, it first determines the node server that currently has the least number of video capturing tasks assigned, and then distributes the video capturing task to that node server.

As the management server distributes more video capturing tasks to a node server, the work load of the node server performing the video capturing tasks also increases. Due to the randomness of the shooting time recorded in the video capturing task, it may result in that, in a certain period of time, some node servers performs more video capturing tasks while some other node servers performs fewer video capturing tasks, or a work load imbalance of node servers. Therefore, it is desired to improve the video cloud storage system to enhance its load balancing ability for improving the overall system efficiency.

SUMMARY

According to an aspect of the present disclosure, a system for balancing loads during a distribution of a video capturing task may comprises a first plurality of video capturing devices and one or more task distributors. Each of the first plurality of video capturing devices may be configured to obtain a video when executing a video capturing task. The one or more task distributors may be configured to distribute video capturing tasks to the first plurality of video capturing devices. During operation, the one or more task distributors may determine first time information related to when a first video capturing task is to be executed, and determine a second plurality of video capturing devices from the first plurality of video capturing devices to distribute the first video capturing task. For each of the second plurality of video capturing devices, the one or more task distributors may determine second time information related to when at least one second video capturing task is to be executed by the video capturing device. The one or more task distributors may also determine, based on the first time information and the second time information, a target video capturing device from the second plurality of video capturing devices, and assign the first video capturing task to the target video capturing device.

In some embodiments, to determine the target video capturing device, the one or more task distributors may determine, for each of the second plurality of video capturing devices based on the first time information and the second time information, a load variance of the video capturing device when the first video capturing task is assigned to the video capturing device. The one or more task distributors may also determine at least one candidate video capturing device with a minimum load variance from the second plurality of video capturing devices, and determine the target video capturing device from the at least one candidate video capturing device.

In some embodiments, to determine the load variance of the video capturing device, the one or more task distributors may determine, based on the first time information and the second time information, a maximum count of the video capturing tasks to be executed in parallel by the video capturing device. The one or more task distributors may also determine a minimum count of the video capturing tasks to be executed in parallel by the video capturing device, and determine a count difference between the maximum count and the minimum count as the load variance of the video capturing device.

In some embodiments, to determine the target video capturing device, the one or more task distributors may select from the at least one candidate video capturing device a candidate video capturing device with a minimum count of second video capturing tasks as the target video capturing device.

In some embodiments, to determine the second plurality of video capturing devices, the one or more task distributors may obtain a task-count threshold. And for each of the first plurality of video capturing devices, the one or more task distributors may determine a first count of assigned video capturing tasks of the video capturing device, and select the video capturing device as one of the second plurality of video capturing devices when the first count of the video capturing device is less than the task-count threshold.

In some embodiments, to determine the task-count threshold, the one or more task distributors may determine a minimum value and an average value of the first counts, and determine a weighted sum of the minimum value and the average value as the task-count threshold.

In some embodiments, the system may further comprise a video capturing network. Each one of the first plurality of video capturing devices may include a node server in the video capturing network. When executing a video capturing task, the node server may direct at least one camera to capture a video.

In some embodiments, the one or more task distributors may determine an overloaded or high-loaded video capturing device from the first plurality of video capturing devices, and determine from a list of tasks assigned to the overloaded video capturing device a third video capturing task that has not been executed. The third video capturing task may have a highest estimated resources usage among all the video capturing tasks that has not been executed. The one or more task distributors may remove the third video capturing task from the list of the overloaded or high-loaded video capturing device, and re-distribute the third video capturing task to the first plurality of video capturing devices.

In some embodiments, the system may further comprise at least one terminal, which may be configured to communicate with a network and generate the first video capturing task. The one or more task distributors may further receive the first video capturing task from the at least one terminal via the network.

In some embodiments, the target video capturing device may be further configured to transmit a video obtained by executing the first video capturing task to the at least one terminal via the network.

In some embodiments, the system may further comprise a storage device, which may be configured to communicate with the network. The target video capturing device may be further configured to transmit a video obtained by executing the first video capturing task to the storage device via the network, and the at least one terminal may be further configured to obtain the video from the storage device via the network.

According to another aspect of the present disclosure, a system for balancing loads during a distribution of a video capturing task may comprise a first plurality of video capturing devices and a task distributor. Each of the first plurality of video capturing devices may be configured to obtain a video when executing a video capturing task. The task distributor may be configured to distribute video capturing tasks to the first plurality of video capturing devices. The task distributor may include a first time information determination module, a video capturing devices selection module, a second time information determination module, a target video capturing device determination module, and an assigning module. The first time information determination module may be configured to determine first time information related to when a first video capturing task is to be executed. The video capturing devices selection module may be configured to determine a second plurality of video capturing devices from the first plurality of video capturing devices to distribute the first video capturing task. The second time information determination module may be configured to, for each of the second plurality of video capturing devices, determine second time information related to when at least one second video capturing task is to be executed by the video capturing device. The target video capturing device determination module may be configured to determine, based on the first time information and the second time information, a target video capturing device from the second plurality of video capturing devices. The assigning module may be configured to assign the first video capturing task to the target video capturing device.

According yet to another aspect of the present disclosure, a method for balancing loads during a distribution of a video capturing task may comprise determining first time information related to when a first video capturing task is to be executed, and determining a second plurality of video capturing devices from a first plurality of video capturing devices to distribute the first video capturing task. Each of the first plurality of video capturing devices may obtain a video when executing a video capturing task. The method may also include determining, for each of the second plurality of video capturing devices, second time information related to when at least one second video capturing task is to be executed by the video capturing device. The method may further include determining, based on the first time information and the second time information, a target video capturing device from the second plurality of video capturing devices. The method may also include assigning the first video capturing task to the target video capturing device.

According yet to another aspect of the present disclosure, a non-transitory computer readable medium may store instructions. The instructions, when executed by a processor, may cause the processor to execute operations. The operations may include determining first time information related to when a first video capturing task is to be executed, and determining a second plurality of video capturing devices from a first plurality of video capturing devices to distribute the first video capturing task. Each of the first plurality of video capturing devices may obtain a video when executing a video capturing task. The operations may also include, for each of the second plurality of video capturing devices, determining second time information related to when at least one second video capturing task is to be executed by the video capturing device. The operations may further include determining, based on the first time information and the second time information, a target video capturing device from the second plurality of video capturing devices, and assigning the first video capturing task to the target video capturing device.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTIONS OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 1 is a schematic diagram illustrating an exemplary video capturing system according to some embodiments of the present disclosure;

FIGS. 2-A and 2-B are schematic diagrams illustrating exemplary video capturing devices including node servers according to some embodiments of the present disclosure;

DETAILED DESCRIPTION

The present disclosure is directed to a system and method of a video capturing system that effectively balancing work load among a plurality of video capturing devices (e.g., node servers) in the system, and thereby increasing video capturing efficiency of the entire system while reducing workload of some heavily loaded video capturing devices in the system. During the distribution of a video capturing task, the systems and methods in the present disclosure may take into consideration the time points or time slots that each video capturing device executes its assigned video capturing tasks. Moreover, the systems and methods may also take into consideration a count of video capturing tasks performed by each video shooting device in parallel at a specific time, so as to achieve a load balancing among the plurality of video capturing devices.

In the following detailed description, numerous specific details are set forth by way of examples in order to provide a thorough understanding of the relevant disclosure. However, it should be apparent to those skilled in the art that the present disclosure may be practiced without such details. In other instances, well known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a", "an", and "the" may be intended to include the plural forms as well, unless the context clearly indicates otherwise. It will be further understood that the terms "comprise", "comprises", and/or "comprising", "include", "includes", and/or "including", when used in this specification, specify the presence of stated features, integers, steps, operations, elements, and/or components, but do not preclude the presence or addition of one or more other features, integers, steps, operations, elements, components, and/or groups thereof.

It will be understood that the term "system," "unit," "module," and/or "block" used herein are one method to distinguish different components, elements, parts, section or assembly of different level in ascending order. However, the terms may be displaced by another expression if they achieve the same purpose.

Figure 3:
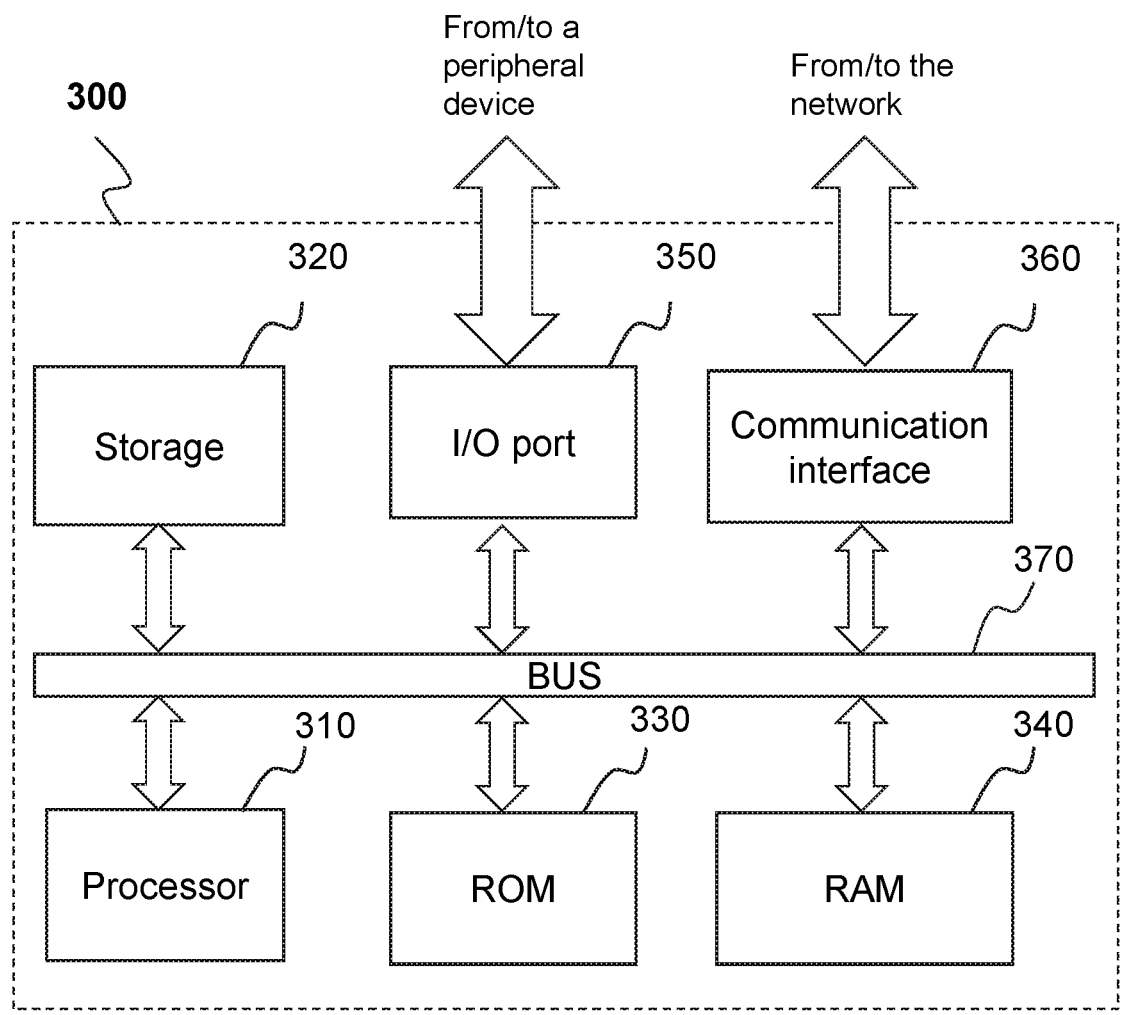
FIG. 3 illustrates an exemplary computing device for implementing one or more components of the video capturing system 100.

Generally, the word "module," "sub-module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., processor 310 as illustrated in FIG. 3) may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in a firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure.

{{FIGS. 1, 2-A, 2-B}}

Figure 1:
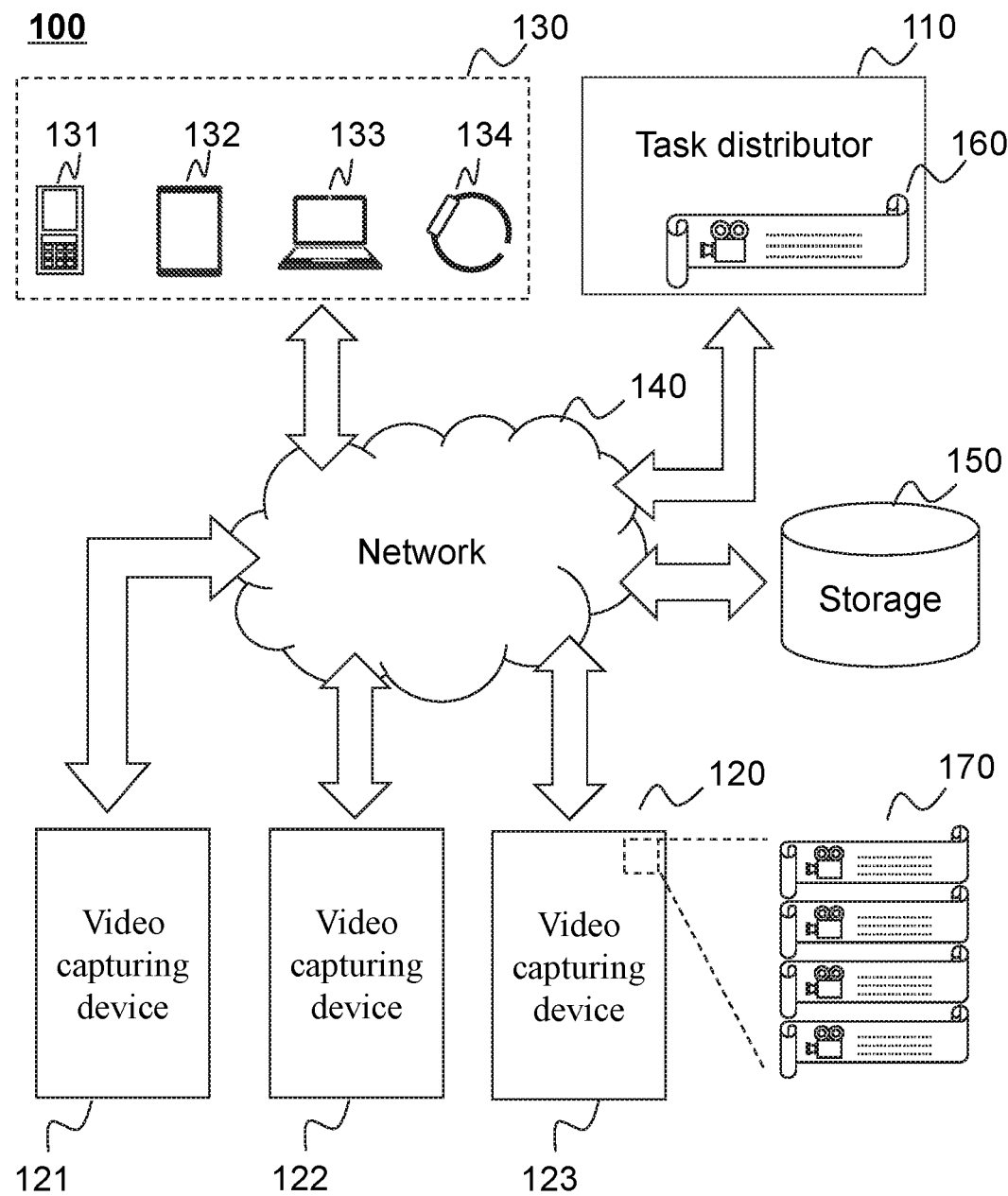

FIG. 1 is a schematic diagram illustrating an exemplary video capturing system according to some embodiments of the present disclosure. As shown, the video capturing system 100 may include a task distributor 110, a plurality of video capturing devices 120, a terminal 130 (or a plurality of terminals 130), network 140, and a network storage device 150.

The task distributor 110 may distribute a video capturing task 160 (a first video capturing task) to the video capture device 120. The video capturing device 120 may obtain one or more videos after the video capturing task 160 is performed. The video may be in the form of a video file or a video stream. The task distributor 110 may distribute the video capturing task 160 to the video capturing device 120 via a cable or network 140. The video capturing task 160 may be generated by the task distributor 110. Alternatively, the video capturing task 160 may be generated by the terminal 130 and sent to the task distributor 110 via the network 140. After generating or receiving the video capturing task 160, the task distributor 110 may select one video capturing device 120 among the plurality of video capturing devices 120 for distributing the task. The video capturing device 120 generates a load when performing a video capturing task.

Generally, the term "load," or "workload," as used herein, is a measure of the amount of tasks or computational work that a computing system (e.g., a video capturing device 120) performs within a given time period. When the load of a video capturing device 120 is increased and the computing resources (e.g., CPU use, CPU thread, bus bandwidth, network bandwidth, memory occupation) of the video capturing device 120 become a bottleneck (which may also be referred to as overloaded), the performance of the video capturing device 120 may be decreased. For demonstration purposes, when a video capturing device 120 is working at its limit under normal conditions without malfunction, the video capturing device 120 may be referred to as full-loaded or as having a full load. When a video capturing device 120 is working at a ≥95% (or any other proper value) full-loaded status, the video capturing device 120 may be referred to as overloaded. When a video capturing device 120 is working at a ≥75% (or any other proper value) full-loaded status, the video capturing device 120 may be referred to as high-loaded or as having a high load. When a video capturing device 120 is working at a ≤40% (or any other proper value) full-load status, the video capturing device 120 may be referred to as low-loaded or as having a low load. Otherwise, the video capturing device 120 may be referred to as moderate-loaded or as having a moderate load.

The task distributor 110 may balance workloads of the plurality of video capturing devices 120 by distributing tasks in a process as described below to prevent some of the plurality of video capturing devices 120 being overloaded or high-loaded while some of the plurality of video capturing devices 120 are idle or low-loaded, so that the overall performance of the video capturing system 100 may be improved.

The task distributor 110 may determine one or more execution time points or time slots (or be referred to as first time information) of the video recording task 160. In some embodiments, the video capturing task 160 may include one or more parameters (time parameters) related to the execution time point or time slot of the video capturing task 110, such as a start time point, an end time point, an execution duration, etc. The task distributor 110 may determine the first time information based on the time parameter(s). In the present disclosure, the video capturing devices 120 being able to communicate with the task distributor 110 and receive and execute video capturing tasks distributed (or assigned) by the task distributor 110 may be referred to as a first plurality of video capturing devices; the video capturing device selected by the task distributor 110 from the first plurality of video capturing devices for actually performing the task distribution may be referred to as a second plurality of video capturing devices. For example, the first plurality of video capturing devices may be the video capturing devices 121, 122, and 123, and the second plurality of video capturing devices may be the video capturing devices 122 and 123. After selecting the second plurality of video capturing devices from the first plurality of video capturing devices, for each of the second plurality of video capturing devices, the task distributor 110 may determine one or more execution time points or time slots (or be referred to as second time information) for each of one or more video capturing tasks 170 (second video capturing tasks) already assigned to the video capturing device. The second time information may be determined based on, for example, time parameter(s) included in the video capturing task 170. Based on the first time information and the second time information, the task distributor 110 may determine a target video capturing device (e.g., the video capturing device 123) in the second plurality of video capturing devices 120 and assign the video capturing task 160 to the target video capturing device.

The task distributor 110 may be one or a plurality of computing devices (e.g., illustrated in FIG. 3). In some embodiments, the task distributor 110 may be a server (e.g., a task management server). In some embodiments, the task distributor 110 may be a server's software or hardware component.

The video capturing device 120 may execute the video capturing task 160/170 and obtain a video correspondingly. The video capturing device 120 may include one or more cameras or may communicate with one or more cameras via one or more cables or wirelessly (e.g., via the network 140). At the execution time point or during the execution time slot of the video capturing task, the video capturing device 120 may direct one or more cameras to capture and receive one or more videos. In the video capturing system 100, some of the video capturing devices 120 may shoot a same shooting scene.

In some embodiments, the video capturing device 120 may be a stand-alone camera device, such as a webcam. When performing the video capturing task, the video capturing device 120 may directly capture and obtain a video.

In some embodiments, the video capturing device 120 may be or include a node server. The node server may communicate with one or more cameras via one or more cables or the network 140. When performing a video capturing task, the node server may direct the camera to take a picture. For example, the node server may generate a control signal based on the video capturing task and transmit the control signal to the camera to direct the camera to capture the video, and then obtain the captured video. Merely for demonstration purposes, exemplary video capturing devices 120 including a node server are illustrated in FIGS. 2-A and 2-B.

Videos captured by the video capturing device 120 may be stored in its internal storage module (e.g., memory, hard disk, memory chip, etc.) or transmitted to the network storage device 150 or the terminal 130 via the network 140 for storage or display.

The terminal 130 may generate the video capturing task 160 and send the video capturing task 160 to the task distributor 110 (e.g., via the network 140). Alternatively or additionally, the terminal 130 may receive the video obtained by the video capturing device 120 for executing the video capturing task 160/170. For example, the terminal 130 may receive the video (e.g., a video file, a video stream)

from the video capturing device 120 or from the network storage device 150. The terminal 130 may provide a user interface (UI). Through the UI, the user may generate/send the video capturing task 160 or receive the video.

In some embodiments, the task distributor 110 may have the function of the terminal 130, and the terminal 130 may be removed from the video capturing system 100.

In some embodiments, the terminal 130 may be a mobile device and generate/send the video capturing task 160 or receive the video via the network 140. The terminal 130 may be various in forms. For example, the terminal 130 may include a mobile phone 131, a tablet computer 132, a laptop computer 133, a wearable device 134, or the like, or any combination thereof. In some embodiments, the wearable device 134 may include a bracelet, footgear, eyeglasses, a helmet, a watch, clothing, or the like, or any combination thereof.

The network 140 may include any suitable network that may facilitate a transmission of data and signals between the components of video capturing system 100. For example, the network 140 may facilitate a transmission of video capturing task 160 from the task distributor 110 to a target video capturing device (e.g., video capturing device 123), a transmission of video capturing task 160 from the terminal 130 to the task distributor 110 (optional), a transmission of a video (a video file or a video stream) from a video capturing device 120 or the network storage device 150 to the terminal 130 (optional), etc.

The network 140 may be and/or include one or more types of networks. For example, the network 140 may be and/or inclue a public network (e.g., the Internet), a private network (e.g., a local area network (LAN), a wide area network (WAN)), a wired network (e.g., an Ethernet network), a wireless network (e.g., an 802.11 network, a Wi-Fi network), a cellular network (e.g., a Long Term Evolution (LTE) network), a frame relay network, a virtual private network ("VPN"), a satellite network, a Bluetooth™ network, a ZigBee™ network, a near field communication (NFC) network, or the like, or any combination thereof. The network 140 may also include wired and/or wireless network access points, such as base stations, internet exchange points, routers, hubs, gateways, switches, server computers, and/or any combination thereof.

In some embodiments, the components of the video capturing device 130 may be directly connected by cables, and the network 140 is optional.

The network storage device 150 may be configured to store one or more videos obtained by the video capturing device 120 executing the video capturing task 160/170. The network storage device 150 may receive the video from the video capturing device 120 via the network 140. The terminal 130 and/or the task distributor 110 may obtain stored videos from the network storage device 150 over the network 140. The network storage device 150 may be any device that is capable of communicating with the network 140 and storing data. In some embodiments, the network storage device may be one or a plurality of servers (e.g., a cloud storage server).

In some embodiments, the video captured by the video capturing device 120 by executing the video capturing task 160/170 may be stored in the video capturing device 120, or be received by the terminal 130 or the task distributor 110 via the network 140. The network storage 150 may be removed from the video capturing system 100.

{{FIGS. 2-A and 2-B}}

FIGS. 2-A and 2-B are schematic diagrams illustrating exemplary video capturing devices including node servers according to some embodiments of the present disclosure. The video photographing apparatuses 200A and 200B may include a node server 210A and a node server 210B, respectively. The node servers 210A and 210B may receive the video capturing task (e.g., video capturing task 160) distributed or assigned by the task distributor 110 via the network 140. When executing the video capturing task, the node servers 210A and 210B may direct at least one camera to capture one or more videos. For example, the node servers 210A and 210B may generate a control signal based on the video capturing task and transmit the control signal to at least one camera. After receiving the control signal, the camera may perform a corresponding video capturing to obtain one or more videos (e.g., in the form of a video file or a video stream). The node servers 210A and 210B may obtain the captured video from the camera and store or send the video to the network storage device 150, the task distributor 110, or the terminal 130.

In some embodiments, the at least one camera described above may include multiple cameras. These cameras may have the same or different geographical locations, types, or capabilities, etc. The video recording task may include parameters (camera parameters) representing camera identification information and/or communication means. For example, the camera parameters may be or may include a network address (e.g., an IP address), a physical address (e.g., a MAC address), a serial number, location (e.g., GPS data), or the like, or a combination thereof, of a corresponding camera. The node servers 210A and 210B may select a corresponding camera to perform the video capturing task based on the camera parameters.

The node server 210A may communicate with one or more cameras 220 (e.g., cameras 221 and 222) via cables 211, such as sending control signals or receiving videos. One or more interfaces may be included in the cables 211. In some embodiments, the cables 211 may include one or more coaxial cables, and a transmission of energy and video signals (analog signals) may be performed between the node server 210A and the camera 220 using a power over coax (POC) technology. Taking the camera 221 as an example, the camera 221 and the node server 210A may be connected by a single coaxial cable through which the node server 210A may simultaneously provide energy to the camera 221 and receive analog video signals from the camera 221.

The node server 210B may communicate with one or more cameras 230 (e.g., cameras 231 and 232) over the network 260, such as sending control signals or receiving videos. The description of network 260 may be the same as or similar to that of the network 140, which are not repeated herein. The network 260 may be the network 140, a sub-network of the network 140, or a network that is independent of the network 140. The camera 230 may be a webcam or a surveillance camera capable of communicating with the network 260 through cables or wirelessly. The camera 230 may be a standalone device. Alternatively or additionally, the camera 230 may be included in a mobile computing device (e.g., mobile phone, laptop) or a movable device, such as an unmanned vehicle, an unmanned aerial vehicle (UAV), a robotic arm, etc. In some embodiments, the network 260 may include a wireless network and the camera 230 may wirelessly communicate with the network 260.

A same camera 230 may be configured to communicate with one or more node servers. Taking the camera 231 as an example, in some embodiments, the camera 231 may be configured to only communicate with the node server 210B. A video capturing task that needs to be performed by the camera 231 may be assigned to the node server 210B.

Alternatively, the camera 231 may communicate with a plurality of node servers through the network 260. For example, the camera 231 may be controlled by both the node server 210B and another node server 211 (or another video capturing device 120). When the load on the node server 210B is high, the task distributor 110 may distribute a video capturing task to be performed by the camera 231 (e.g., the task includes camera parameters related to the camera 231) to the node server 211 instead of the sever node 210B. The node server 211 may execute the video capturing task to direct the camera 231 to capture the video. Alternatively or additionally, when the workload on the node server 210B is high, the task distributor 110 may re-distribute the unexecuted video capturing task (e.g., to be performed by the camera 231) that has been assigned to the node server 210B (e.g., re-assigning the task to the node server 211), so that the workload of the node server 2106 may be reduced.

In some embodiments, a node server included in a video capturing device 120 may be a hybrid of the sever nodes 200A and 200B. For example, the node server may communicate with a first plurality of cameras with cables and may communicate with a second plurality of cameras wirelessly (e.g., via the network 140/260).

The video capturing system 100 may have various application fields, such as security surveillance (e.g., public security, home security), traffic monitoring, emergency monitoring, photography (e.g., time-lapse photography, aerial photography), baby or pet care, etc. The above application fields are only for demonstration purpose and are not intended to be limiting.

It should be noted that the above descriptions of the video capturing system 100 are only for demonstration purposes and are not intended to be limiting. It is understandable that, after learning the major concept and the mechanism of the present disclosure, a person of ordinary skill in the art may alter the video capturing system 100 in an uncreative manner. The alteration may include combining and/or splitting modules or sub-modules, adding or removing optional modules or sub-modules, etc. For example, the task distributor 120, the terminal 130, and/or the network storage device 140 may be integrated into a single device. All such modifications are within the protection range of the present disclosure.

{{FIG. 3}}

FIG. 3 illustrates an exemplary computing device for implementing one or more components of the video capturing system 100 (e.g., the task distributor 110, the node server 210A and 210B). The computing device 300 may be configured to perform one or more operations disclosed in the present disclosure. The computing device 200 may include a bus 370, a processor 310, a read only memory (ROM) 330, a random access memory (RAM) 340, a storage 320 (e.g., massive storage device such as a hard disk, an optical disk, a solid-state disk, a memory card, etc.), an input/output (I/O) port 350, and a communication interface 360. It may be noted that, the architecture of the computing device 300 illustrated in FIG. 3 is only for demonstration purposes, and not intended to be limiting.

In some embodiments, the computing device 300 may be a single device. Alternatively, the computing device 300 may include a plurality of computing devices having a same or similar architecture as illustrated in FIG. 3, and one or more components of the computing device 300 may be implemented by one or more of the plurality of computing devices.

The bus 370 may couple various components of computing device 300 and facilitate transferring of data and/or information between them. The bus 370 may have any bus structure in the art. For example, the bus 370 may be or may include a memory bus and/or a peripheral bus.

The I/O port 350 may allow a transferring of data and/or information between the bus 370 and one or more peripheral device (e.g., one or more cameras 220, one or more input devices (e.g., a keyboard, a mouse, a joystick, a microphone), one or more output devices (e.g., a display, a loudspeaker, a printer)). The I/O port 350 may include a USB port, a COM port, a PS/2 port, an HDMI port, a VGA port, a video cable socket such as an RCA sockets and a Mini-DIN socket, a coaxial cable port (e.g., for implementing a POC technique), or the like, or a combination thereof.

The communication interface 360 may allow a transferring of data and/or information between the network 150/260 and the bus 370. For example, the communication interface 360 may be or may include a network interface card (NIC), a Bluetooth™ module, an NFC module, etc.

The ROM 330, the RAM 340, and/or the storage 320 may be configured to store computer readable instructions that may be executed by the processor 310. The RAM 340, and/or the storage 320 may store date and/or information obtained from a peripheral device (e.g., one or more cameras 220) and/or the network 150/260. The RAM 340, and/or the storage 320 may also store date and/or information generated by the processor 310 during the execution of the instruction.

The processor 310 may be or include any processor in the art configured to execute computer readable instructions (e.g., stored in the ROM 330, the RAM 340, and/or the storage 320), so as to perform one or more operations or implement one or more modules/units disclosed in the present disclosure. For example, the processor 210 may perform a distribution of a video capturing task (e.g., the video capturing task 160) in a process illustrated in FIG. 9 or FIG. 12.

{{FIG. 4}}

Figure 4:
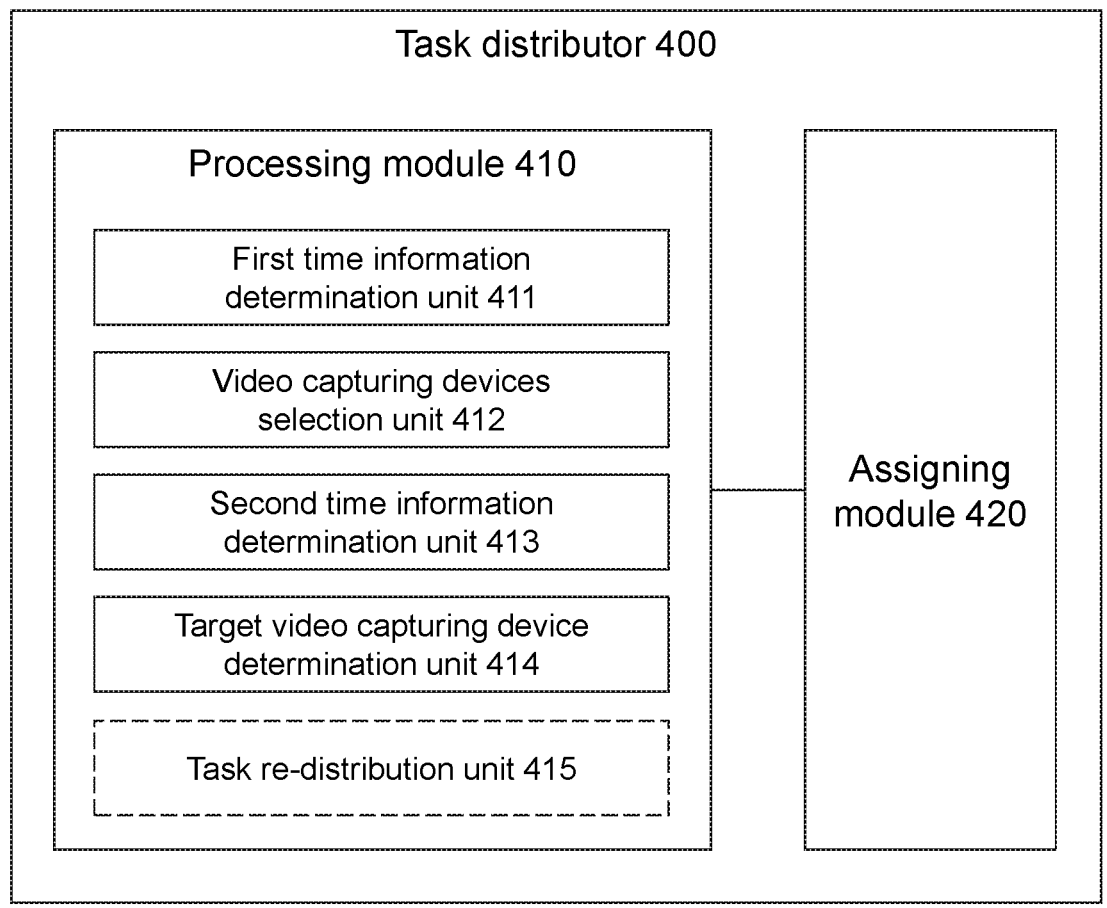
FIG. 4 is a schematic diagram illustrating an exemplary task distributor according to some embodiments of the present disclosure.
Figure 9:
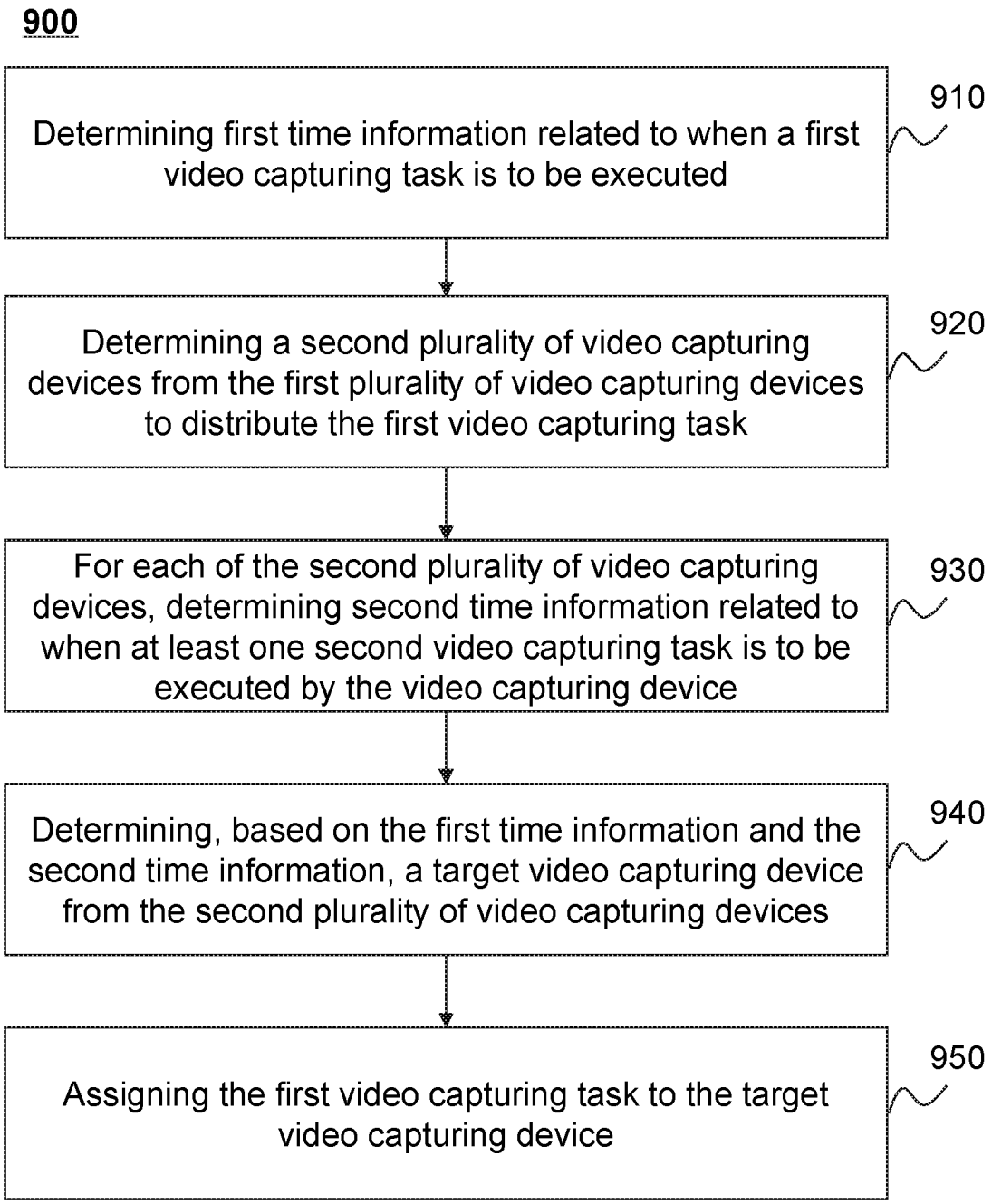
FIG. 9 is a schematic diagram illustrating an exemplary task distribution process according to some embodiments of the present disclosure.
Figure 12:
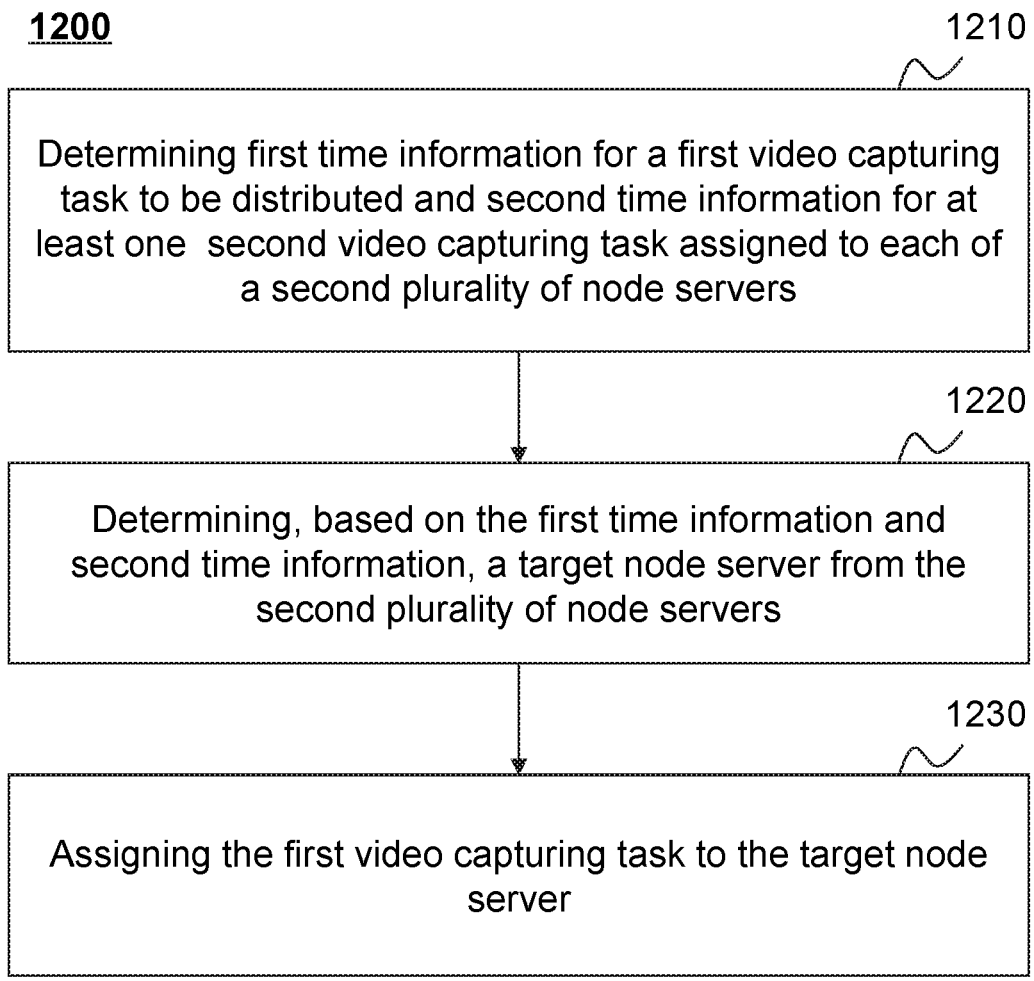
FIG. 12 is a schematic diagram illustrating an exemplary task distribution process performed by the system illustrated in FIG. 8 according to some embodiments of the present disclosure.

FIG. 4 is a schematic diagram illustrating an exemplary task distributor according to some embodiments of the present disclosure. Task distributor 400 may be an exemplary embodiment of the task distributor 110. The task distributor 400 may perform process 900 or 1200 as illustrated in FIG. 9 or FIG. 12. The task distributor 400 may include a processing module 410 and an assigning module 420. The processing module 410 may include a first time information determination unit 411, a video capturing devices selection unit 412, a second time information determination unit 413, a target video capturing device determination unit 414, and a task re-distribution unit 415 (optional).

The processing module 410 may determine first time information of the video capturing task to be distributed (the first video capturing task, for example, the video capturing task 160). The first time information may be related to when the first video capturing task is to be executed, such as the execution time point or execution time slot of the first video capturing task. The processing module 410 may determine the first time information via the first time information unit 411.

Figure 5:
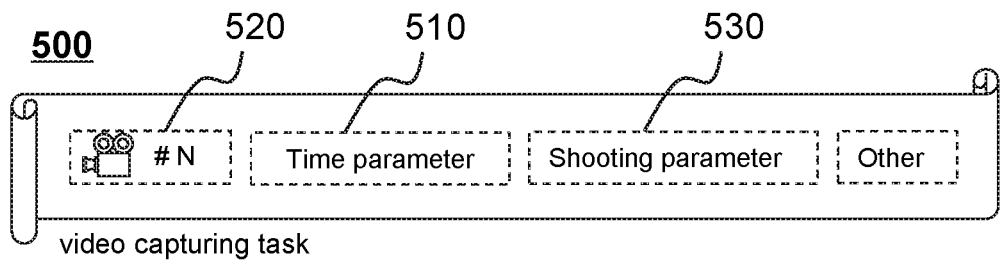
FIG. 5 is a schematic diagram illustrating an exemplary video capturing task according to some embodiments of the present disclosure.

The video recording task may include at least one time parameter (e.g., time parameter 510 as shown in FIG. 5) for indicating an execution time point or an execution time slot of the video capturing task. The at least one time parameter may include one or more of a start time, an end time, an execution duration, a video capturing period, etc., of the video capturing task. The first time information unit 411 may determine the first time information by using the time parameter of the first video capturing task. Detailed descriptions of the time parameter and the video capturing task are provided elsewhere in the present disclosure (e.g., in connection with FIG. 5).

Figure 6:
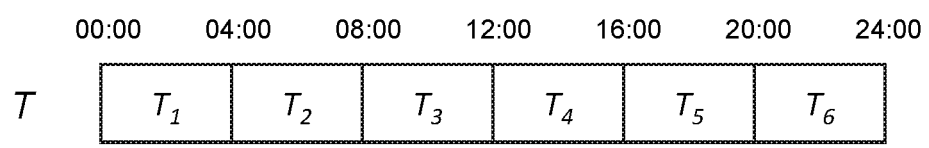
FIG. 6 is a schematic diagram illustrating an exemplary first time information according to some embodiments of the present disclosure.

The first time information determined by the first time information unit 411 may have a variety of forms or data structures. For example, the first time information may have the form of an array (or vector). In some embodiments, the first time information determined by the first time information unit 411 may have the form (array T) as shown in FIG. 6. FIG. 6 is a schematic diagram illustrating an exemplary first time information according to some embodiments of the present disclosure.

The array T may be a one-dimensional array of a series of parameters $T_i$ ($1 \leq i \leq n$). n may represent the number of time points or time slots available for performing the video capturing task each day. Each parameter $T_i$ may be used to determine whether the corresponding video capturing task is to be executed at a specific time point or within a specific time slot. For example, as shown in FIG. 6, parameter $T_1$ may represent whether the video capturing task is to be executed at the time point 0:00 or within the time slot [0:00, 4:00), and the parameter $T_2$ may represent whether the video capturing task is to be executed at the time point 4: 00 or within the time slot [4:00, 8:00) during this time slot. The specific value of each parameter $T_i$ may represent whether the video capturing task is to be executed at the corresponding time point or within the corresponding time slot. For example, $T_i=0$ may represent that the video capturing task is not to be executed, and $T_i=1$ may represent that the video capturing task is to be executed at the corresponding time point or within the corresponding time slot. The array T may further include parameters representing the execution date or execution period of the video capturing task at the corresponding time point or within the corresponding time slot. When $T_i$ s of the array T represent time slots, the length of the time slots may be equal or unequal.

It may be understood that, the first time information may also take another form or data structure without departing from the major concept of the present disclosure.

Refer back to FIG. 4. The processing module 410 may determine a second plurality of video capturing devices from the first plurality of video capturing devices to distribute the first video capturing task. The first plurality of video capturing devices (e.g., the video capturing devices 120) may be video capturing devices capable of executing video capturing tasks to obtain videos and receiving video capturing tasks (first video capturing task) distributed by the task distributor 110 (e.g., via the network 140). The second plurality of video capturing devices may be one or more of the first plurality of video capturing devices (e.g., the video capturing devices 122 and 123) satisfying a certain selection criterion and be selected by the task distributor 310 for distributing the first video capturing task. In some embodiments, the selection criterion may be based on loads of the first plurality of video capturing devices. Alternatively or additionally, the selection criterion may be based on shooting scenes, performances, availabilities, etc., of the cameras controlled by the first plurality of video capturing devices to capture the video specified by the video capturing task. The processing module 410 may determine the second plurality of video capturing devices via the video capturing devices selection unit 412.

Figure 8:
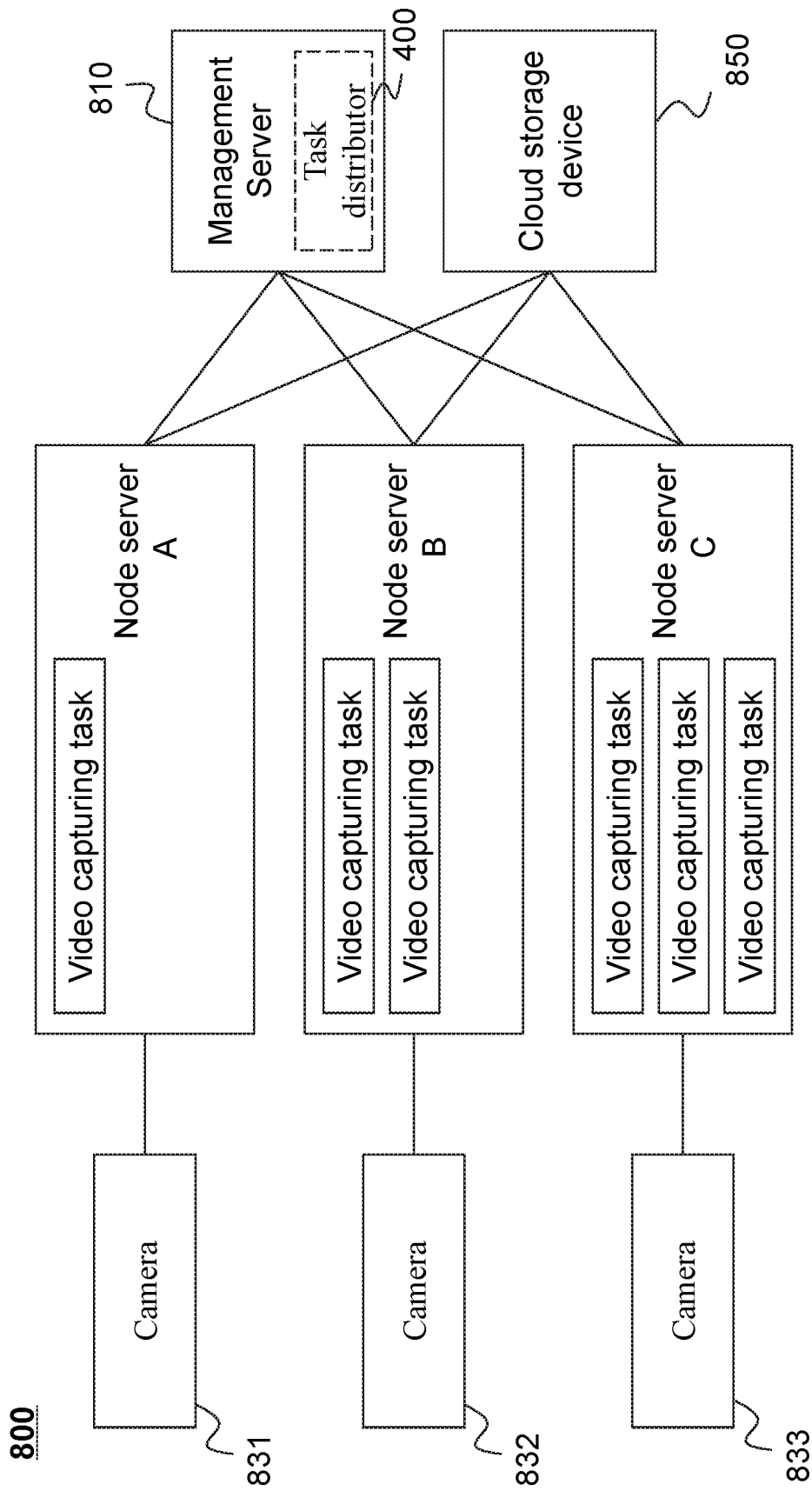
FIG. 8 is a schematic diagram illustrating an exemplary embodiment of the video capturing system illustrated in FIG. 1 according to some embodiments of the present disclosure.

In some embodiments, the task distributor 400 may be a server for task management and distribution (e.g., management sever 810 as illustrated in FIG. 8) or its software or hardware component. The first plurality of video capturing devices may be all the task-executing devices managed by the sever (e.g., node server 820 illustrated in FIG. 8). The second plurality of video capturing devices may be the idle ones or low-loaded ones of the first plurality of video capturing device.

The video capturing devices selection unit 412 may determine the first plurality of video capturing devices, and then determine the second plurality of video capturing devices therefrom. In some embodiments, the video capturing devices selection unit 412 may determine the first plurality of video capturing devices through a video capturing device recording list. The video capturing device recording list may record information (e.g., serial number, network address, physical address, connection port, etc.) on the first plurality of video capturing devices. The video capturing device recording list may be pre-stored in a storage device (e.g., network storage device 150, Storage 320, ROM 330, and RAM 340) to be accessed by the task distributor 110. In some embodiments, video capturing devices selection unit 412 may detect the first plurality of video capturing devices in real time (e.g., both in the same local area network).

After determining the first plurality of video capturing devices, the processing module 410 may determine the second plurality of video capturing devices from the first plurality of video capturing devices. In some embodiments, the video capturing devices selection unit 412 may directly assign all of the first plurality of video capturing devices as the second plurality of video capturing devices for distributing the first video capturing task. In some embodiments, the video capturing devices selection unit 412 may select the second plurality of video capturing devices from the first plurality of video capturing devices based on a selection criterion. The configuring of the selection criterion may be determined based on the application scenario of the video capturing system 100. For example, when the video capturing device 120 has a configuration as shown in FIG. 2-A, the selection criterion may be that the camera 220 locates at the shooting scene. As another example, when the video capturing device 120 has a configuration as shown in FIG. 2-B, the selection criterion may be that the workload (for example, a count of the assigned tasks) or the computing resource occupation is below a specific threshold or have a rank within a certain scope of a workload ranking and/or a computing resource occupation ranking.

The processing module 410 may determine the second time information for each of the second plurality of video capturing devices. The second time information may be related to when one or more video capturing tasks (second video capturing tasks) assigned to the video capturing device are to be executed. The processing module 410 may determine the second time information via the second time information determination unit 413.

Figure 7:
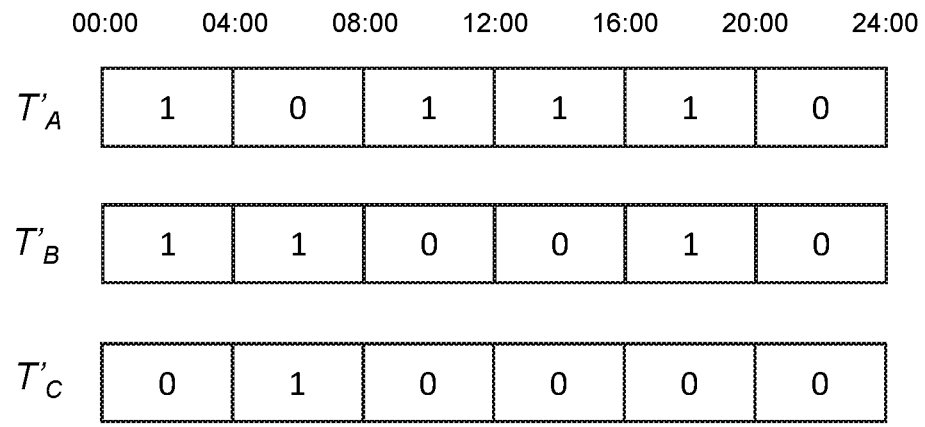
FIG. 7 is a schematic diagram illustrating exemplary second time information according to some embodiments of the present disclosure.

The description of the second time information may be the same as or similar to the description of the first time information. For example, the second time information may be represented by an array T' (e.g., an array $T'_A$, $T'_B$, or $T'_C$ as shown in FIG. 7), which corresponds to the array T of the first time information (e.g., as shown in FIG. 6). FIG. 7 is a schematic diagram illustrating exemplary second time information according to some embodiments of the present disclosure. As shown in FIG. 7, each parameter of the array T' and the corresponding parameter of the first time information array T may correspond to a same time point or time slot and may share a same meaning. After a first video capturing task is assigned to a video capturing device by the task distributor 400, its first time information may be used as second time information in the following task distributions. When one video capturing device has been assigned with a plurality of second video capturing tasks, the second time information determination unit 413 may determine the second time information for each of the plurality of second video capturing tasks (for example, arrays $T'_A$, $T'_B$, and $T'_C$). Multiple one-dimensional arrays T' may also be viewed as one two-dimensional array.

In some embodiments, the second time information (e.g., one or more arrays T') may be generated by the video capturing device and stored in an internal storage module of the video capturing device (e.g., storage 320, RAM 340). The second time information determination unit 413 may acquire, from each of the second plurality of video capturing devices in real time, its stored data or file containing the second time information to determine the second time information thereof.

In some embodiments, the processing module 410 may record each of the video capturing tasks distributed thereby and the video capturing devices receiving the tasks in one or more lists. The second time information determination unit 413 may determine (or generate) the second time information of each second plurality of video image capture devices according to the one or more lists. In some embodiments, during the distribution of the first video capturing task the processing module 410 may record the determined first time information and the video capturing device receiving the task in one or more lists. The recorded first time information may be directly used as the second time information in future distribution of video capturing tasks.

The processing module 410 may determine, based on the first time information and the second time information, a target video capturing device from the second plurality of video capturing devices. The target video capturing device is the video capturing device to be assigned with the video capturing task. The processing module 410 may determine the target video capturing device via the target video capturing device determination unit 414.

For each of the second plurality of video capturing devices, the target video capturing device determination unit 414 may determine (or estimate), based on the first time information and the second time information, a load variance of the video capturing device when the first video capturing task is assigned to the video capturing device. The load variance may be measured by a difference (weighted or unweighted) between the maximum load (e.g., the maximum number of tasks performed in parallel at the same time or the maximum resource occupation) and the minimum load (e.g., the minimum number of tasks performed in parallel at the same time or the minimum resource occupation) of the video capturing device within a given time period (e.g., a video capture period). The target video capturing device determination unit 414 may determine at least one candidate video capturing device with a minimum load variance from the second plurality of video capturing devices and determine the target video capturing device from the at least one candidate video capturing device. For example, the target video capturing device determination unit 414 may select one video capturing device having the minimum load variance from the second plurality of video capturing devices as the target video capturing device. As another example, the target video capturing device determination unit 414 may designate, from the second plurality of video capturing devices, a plurality of video capturing devices having the minimum load variance or having a load variance smaller than a specific threshold as the candidate video capturing devices, and then determine the target video capturing devices from the candidate video capturing devices.

In some embodiments, for each of the second plurality of video capturing devices, the target video capturing device determination unit 414 may determine, based on the first time information and the second time information, a count of tasks that the video capturing device executes in parallel at or within each predetermined time point or time slot when the first video capturing task is assigned to the video capturing device. The target video capturing device determination unit 414 may determine the maximum value and the minimum value therefrom and designate the difference between the maximum value and the minimum value as a load variance (for example, as shown in the FIG. 11).

The assigning module 420 may assign the first video capturing task to the target video capturing device determined by the processing module 410 (or the target video capturing device determination unit 414).

In some embodiments, the processing module 410 may re-distribute a video capturing task (second video capturing task) that has been assigned to a video capturing device. The processing module 410 may perform the re-distribution of a video capturing task by the task redistribution unit 415.

In some embodiments, the video capturing system 100 may have a structure as shown in FIG. 8 (video cloud storage system 800). FIG. 8 is a schematic diagram illustrating an exemplary embodiment of the video capturing system illustrated in FIG. 1 according to some embodiments of the present disclosure. As shown in FIG. 8, the video cloud storage system 800 may include a management server 810, a plurality of node servers 820 (e.g., node servers A, B, and C), a plurality of cameras 830 (for example, cameras 831, 832, 833), and a cloud storage device 850. The management server 810 may include the task distributor 400 as its hardware and/or software components. The node servers 820 and the cloud storage device 850 may be embodiments of the video capturing device 120 and the network storage device 150, respectively. The node servers 820 may communicate with one or more cameras 830 (e.g., camera 220, camera 230) in a configuration as shown in FIG. 2-A (e.g., as node server 210A), as shown in FIG. 2-B (e.g., as node server 210B), or a combination thereof. When executing a video capturing task, the node servers 820 may direct at least one camera 830 to capture a video. The node server 820 may obtain the video from the camera 830 and send the video to the cloud storage device 850 for storage.

The management server 810 may be configured to manage the node servers in the video cloud storage system 800 and distribute the video capturing task to the node server. The distribution process may include: the management server 810 (or the task distributor 400) select a second plurality of node servers (second plurality of video capturing devices) among a first plurality of node servers (first plurality of video capturing devices) managed by the management server 810. After determining first time information for the video capturing task to be distributed (first video capturing task) and second time information for at least one second video capturing task (second video capturing task) assigned to each of the second plurality of node servers, the management server 810 (or task distributor 400) may determine a target node server (target video capturing device) among the second plurality of node servers. Then, the management server 810 may assign the first video capturing task to the target node server.

For example, among the three node servers shown in FIG. 8, the node server A and the node server B may have lower workloads (or counts of the assigned video capturing tasks). The management server 810 (or the task distributor 400) may select and designate the node server A and the node server B as the first plurality of node servers, and then further determine a target node server from the node server A and the node server B. For example, if the node server A is determined to be the target node server, the management server 810 (or the task distributor 400) may assign the first video capturing task to the node server A.

The node servers 820 may be configured to direct a video capturing device to capture a video according to an execution time (a time point or a time slot) indicated by the video capturing task assigned by the management server 810 so as to obtain the captured video (or be referred to as video data) and send the video to the cloud storage device 850 for storage. Each of the node servers 820 may have at least one assigned video capturing task.

The cameras 830 may be configured to capture a video.

The cloud storage device 850 may be configured to store the videos obtained by the node servers 820.

The video cloud storage system 800 may capture videos according to shooting needs of one or more users, store the captured videos, and balancing loads among the node servers.

Refer back to FIG. 4. According to some embodiments of the present disclosure, when the video capturing system 100 takes the form of the video cloud storage system 800, the task distributor 400 may be included in the managing server 810 as a software or hardware component. Correspondingly, the 410 processing module 410 may be configured to determine first time information of the first video capturing task (via the first time information determination unit 411), and determine second time information for the second video capturing task(s) assigned to each of the second plurality of node servers (via the second time information determination unit 412). The first time information and the second time information may be configured to notify the node server when to execute the corresponding video capturing task. The processing module 410 may further determine a target node server (via the target video capturing device determination unit 414) from the second plurality of node servers based on the first time information and the second time information. The assigning unit 420 may be configured to assign the first video capturing task to the target node server.

In some embodiments, the processing module 410 (or the video capturing devices selection unit 412) may further obtain a task-count threshold before determining the first time information and the second time information. The processing module 410 (or the video capturing devices selection unit 412) may select, from the first plurality of node servers, the second plurality of node servers whose count of assigned second video capturing tasks is less than the task-count threshold (for example, select the node servers A and B from the node servers A, B, and C as shown in FIG. 8). In some embodiments, when obtaining the task-count threshold, the processing module 410 (or the video capturing devices selection unit 412) may determine a minimum value and an average value of the counts (first counts) of the second video capturing tasks assigned to each of the first plurality of node servers. The processing module 410 (or the video capturing devices selection unit 412) may calculate a product of the average value and a preset weight value, and add the minimum value and the product to obtain the task-count threshold.

In some embodiments, when determining the target node server from the second plurality of node servers based on the first time information and the second time information, the processing module 410 (or the target video capturing device determination unit 414) may determine, based on the first time information and the second time information for each of the second plurality of node servers, a load variance of the node server when the first video capturing task is assigned to the node server. The load variance may be a difference between a count of video capturing tasks to be executed by the node server within a first time slot (or at a first time point) and a count of video capturing tasks to be executed within a second time slot (or at a second time point), wherein the first time slot is a time slot within which the node server is to execute a maximum count of video capturing tasks in parallel and the second time slot is a time slot within which the node server is to execute a minimum count of video capturing tasks in parallel. The processing module 410 (or the target video capturing device determination unit 414) may select at least one node server (candidate node server, or candidate video capturing device) having the minimum load variance among the second plurality of node servers, and determines the target node server from the at least one candidate node server.

In some embodiments, when the processing module 410 (or the target video capturing device determination unit 414) selects a plurality of candidate node servers, the processing module 410 may designate, from the plurality of candidate node servers, a candidate node server with the minimum count of second video capturing tasks as the target node server.

It should be noted that the above descriptions of the task distributor 400 are only for demonstration purposes, and are not intended to be limiting. It is understandable that, after learning the major concept and the mechanism of the present disclosure, a person of ordinary skill in the art may alter the task distributor 400 in an uncreative manner. The alteration may include combining and/or splitting modules or units, adding or removing optional modules or units, etc. For example, the task re-distribution unit 415 may be removed from the task distributor 400. As another example, the processing module 410 may be split into multiple modules, each of which corresponds to one or more units of the processing module 410. All such modifications are within the protection range of the present disclosure.

{{FIG. 5}}

FIG. 5 is a schematic diagram illustrating an exemplary video capturing task according to some embodiments of the present disclosure. Video capturing task 500 may include parameters required by a video capturing device and/or camera for capturing a video. When executing the video capturing task 500, the video capturing device (or node server) may direct one or more cameras (e.g., included in the video capturing device, independent from the video capturing device but may communicate with the video capturing device) to capture one or more corresponding videos. The video capturing task 500 may be in the form of files, data, or instructions.

The video capturing task 500 may include at least one time parameter 510 for indicating an execution time point or execution time slot of the video capturing task 500. The time parameter 510 may include one or more of a start time, an end time, an execution duration, a video capturing period, etc., of the video capturing task 500. For example, the time parameter 510 may indicate that the time slot for executing the video capturing task 500 is 15:00-17:00 on Feb. 28, 2018. As another example, the time parameter 510 may indicate that the start time for executing the video capturing task 500 is 17:00 every day and the execution duration is 1 hour. In some embodiments, there may be multiple execution time slots for the video capturing task 500. For example, the video capturing task 500 may be used for traffic monitoring. Its time parameter 510 may indicate that the execution time slots of the video capturing task 500 are the rush hours of every workday, for example, 07:00-09:00, and 17:00-19:30. In some embodiments, the video capturing task 500 may be used for security monitoring. Its time parameter 510 may indicate that the video capturing task 500 is kept being executed day by day.

In some embodiments, the video capturing task 500 may include at least one camera parameter 520 for indicating identification information and/or communication means of a camera for capturing the video, such as a serial number, a network address, a physical address, a geographical location, etc. When executing the video capturing task 500, the video capturing device may determine or select a camera for capturing the video based on the camera parameter 520. For example, when the video capturing device is the node server 210B as shown in FIG. 2-B, a network address of the camera 231 may be included in the camera parameter 520 of the video capturing task 500. The node server 210B may use the network address to communicate with the camera 231 via the network 260 to send control signals to the camera 231 and to obtain the video captured by the camera 231.

In some embodiments, the video capturing task 500 may include a shooting parameter 530 that may indicate a shooting mode and/or one or more parameters used by the camera when capturing a video, such as a shooting angle, a shooting track, a frame rate per second (FPS), a video resolution, a video quality, or the like, or a combination thereof. Some shooting parameters 530 may affect the workload or performance of the video capturing device. For example, when the shooting parameter 530 of a video capturing task 500 indicates a video capturing manner generating a video of higher resolution, FPS, or quality, etc., executing the video capturing task 500 may result in a video file larger in size or a video stream larger in bit rate. The video capturing device (e.g., the node server 210A or 210B) may spend more resources (e.g., network bandwidth, CPU use) to receive and/or encode the video file or video stream.

The video capturing task 500 may further include other parameters according to the application scenario. For example, the video capturing task 500 may include one or more parameters (location parameters, e.g., GPS data, etc.) that indicate the geographic location of the shooting scene. The task distributor 110/400 may select, based on the location parameters, the video capturing devices capable of controlling camera(s) that locates at the shooting scene for distributing the video capturing task 500. Alternatively or additionally, the video capturing device may move the camera to the shooting scene for video capturing based on the location parameters.

{{FIGS. 9, 10, 11}}

FIG. 9 is a schematic diagram illustrating an exemplary task distribution process according to some embodiments of the present disclosure. Process 900 may be performed by the task distributor 400 to allocate or distribute video capturing tasks among a plurality of video capturing devices. In some embodiments, one or more operations of process 900 may be implemented in the video capturing system 100 illustrated in FIG. 1. For example, the illustrated process 900 may be stored in a storage module of the task distributor 110 in the form of instructions, and invoked and/or executed by the task distributor 110. One or more operations of the process 900 may be performed by the processor 310 of the computing device 300 as illustrated in FIG. 3 which implements the task distributor 110 or the task distributor 400.

In 910, the first time information determination unit 411 may determine first time information related to when a first video capturing task (video capturing task to be distributed) is to be executed. The determined first time information may have the form of an array T (e.g., as described above in connection with FIGS. 4 and 6). The first time information determination unit 411 may generate the array T based on the time parameter in the first video capturing task.

In some embodiments, the time slot corresponding to each parameter of the array T may be determined by equally dividing the video capturing period of the video capturing devices (e.g., video capturing devices 120) into milliseconds, seconds, minutes, or hours. The video capturing period may be an hour, a day, a week, a month, or a year. For example, the video capturing period may be one day (24 h), and the array T obtained by dividing the video capturing period into six time slots in a unit of four hours (for example, as shown in FIG. 6) may include six parameters, each of which may indicate whether to perform the video capturing task during the corresponding 4 hours. The array T may be expressed as $(T_1, T_2, T_3, T_4, T_5, T_6)$. The more the number of parameters of array T, the execution time of the video capturing task may be set more accurately. For example, when the video recording period (24 h) is divided into 1440 segments in a unit of 1 minute, the array T may include 1440 parameters, indicating whether the video capturing task is executed during the corresponding 1 minute. The array T may be represented as $(T_1, T_2, T_3, \ldots, T_{1439}, T_{1440})$, and the indicated task execution time slot may be accurate to 1 minute.

The configuration of the array T may be predetermined based on the application scenario, a load balancing requirement, and/or the performance of the video capturing devices and/or the task distributor. For demonstration purposes, the present disclosure is described by way of example with reference to an array T with 6 parameters as illustrated in FIG. 6, which is not intended to be limiting. It is understood that the principle of the present disclosure may also be applied to an array T with hundreds or thousands of parameters (e.g., for optimized load balancing capability) as well.

For example, according to one or more time parameters included in a video capturing task, the first time information determination unit 411 may determine that the execution time slot of the video capturing task is 4:00-12:00, and further determine that the corresponding array T is (0, 1, 1, 0, 0, 0). When the first time information determination unit 411 determines that the execution time slot of the corresponding video capturing task is 0:00-8:00 and 16:00-24:00 based on the time parameter, the determined array T may be expressed as (1, 1, 0, 0, 1, 1).

In some embodiments, the value of $T_i$ in the array T may also indicate the estimated computing resources (e.g., CPU use, network bandwidth, bus bandwidth, memory occupation) used by the video capturing device when executing the corresponding video capturing task during the corresponding time slot. $T_i$ corresponding to a time slot when a task having a higher resource occupation is to be executed may have a higher value. The first time information unit 411 may assign the value of $T_{i,j}$ based on one or more look-up tables or functions. Merely for example, for a time slot with a high resource occupation, the corresponding $T_i$ value may be 1.5; for a time slot with a moderate resource occupation, the corresponding $T_i$ value may be 1.2; for a time slot with a low resource occupation, the corresponding $T_i$ value may be 1; for a time slot when the task is not executed, the corresponding $T_i$ value may be 0. In some embodiments, the first time information unit 411 may estimate the resource occupation for a particular time slot based on parameters in the video capturing task (e.g., the shooting parameters 530).

In 920, the video capturing devices selection unit 412 may determine a second plurality of video capturing devices from the first plurality of video capturing devices to distribute the first video capturing task. The video capturing devices selection unit 412 may first determine the first plurality of video capturing devices, and then determine the second plurality of video capturing devices therefrom. In some embodiments, 920 may be performed prior to 910.

In some embodiments, the first plurality of video capturing devices may be recorded in a video capturing device recording list, and the video capturing devices selection unit 412 may determine the first plurality of video capturing devices through the video capturing device recording list. The video capturing device recording list may record information (e.g., serial number, network address, physical address, connection port, etc.) on the first plurality of video capturing devices. The video capturing device recording list may be pre-stored in a storage device (for example, the network storage device 150, the storage 320, the ROM 330, and the RAM 340) to be acquired by the video capturing devices selection unit 412. When adding or installing a new video capturing device as one of the first plurality of video capturing devices, the video capturing device recording list may be updated by the new video capturing device or the task distributor 110/400.

In some embodiments, the video capturing devices selection unit 412 may detect the first plurality of video capturing devices in real time or periodically. For example, the task distributor 410 and the first plurality of video capturing devices may be connected to a same network. The task distributor 410 may detect the task distributor 410 via the network.

After determining the first plurality of video capturing devices, the video capturing devices selection unit 412 may determine the second plurality of video capturing devices from the first plurality of video capturing devices. The second plurality of video capturing devices may shoot the scene indicated by the video capturing tasks for video capturing. In some embodiments, the video capturing devices selection unit 412 may directly set all the first plurality of video capturing devices as the second plurality of video capturing devices for distributing the first video capturing task. In some embodiments, the video capturing devices selection unit 412 may select the second plurality of video capturing devices from the first plurality of video capturing devices. The selection manner may be based on the application scenario of the video capturing system 100. Exemplary application scenarios and corresponding selection manners are descripted bellow, which are only for demonstration purposes and not intended to be limiting.

Scenario 1: The first video capturing task needs to use a specific camera for video capturing. The camera parameter(s) of the first video capturing task may include identification information of the specific camera. The video capturing devices selection unit 412 may select, based on the camera parameters, video capturing devices capable of controlling the specific camera as the second plurality of video capturing devices.

Scenario 2: The first video capturing task needs to shoot a specific scene without limiting the shooting camera. The location parameter(s) of the first video capturing task may include geographical location information of the specific scene. The video capturing devices selection unit 412 may select, based on the location parameter, video capturing devices capable of controlling a camera that locates at the specific scene or a camera movable to the scene as the second plurality of video capturing devices.

Scenario 3: The first video capturing task has a specific shooting requirement for video capturing (e.g., high definition (HD), wide-angle, night vision, etc.) and must use a video camera with a certain function. The shooting parameter(s) of the first video capturing task may include the shooting requirement. The video capturing device selection unit 412 may select, based on the shooting parameters, video capturing devices capable of controlling a camera with the certain function as the second plurality of video capturing devices.

Scenario 4: The task distributor 400 needs to improve the load balancing of the task distribution process. The video capturing devices selection unit 412 may select, according to a current load status of the first plurality of video capturing devices, video capturing devices with lower loads as the second plurality of video capturing devices. For example, the video capturing devices selection unit 412 may select video capturing devices whose workload (e.g., a count of assigned tasks) or compute resource occupation is less than a certain threshold, or whose rank is within a certain scope of a workload ranking and/or a computing resource occupation ranking, as the second plurality of video capturing device.

In some embodiments, the video capturing devices selection unit 412 may obtain a task-count threshold and determine a count (first count) of video capturing tasks assigned to each of the first plurality of video capturing devices. The video capturing devices selection unit 412 may select a video capturing device having a first count less than the task-count threshold as one of the second plurality of video capturing devices.

In some embodiments, the video capturing devices selection unit 412 may determine the minimum value and the average value of the obtained first counts, and determine a weighted sum of the minimum value and the average value as the task-count threshold. For example, the task-count threshold may be obtained by adding the minimum value and a product of a coefficient and the average value. The range of the coefficient may be [0.1, 0.3]. For example, the coefficient may be 0.2.

In 930, for each of the second plurality of video capturing devices, the second time information determination unit 413 may determine second time information of the video capturing device. The second time information may be related to when at least one second video capturing task (video capturing task(s) has already been assigned to the video capturing device) is to be executed. The second time information may have the same form as the first time information (e.g., as shown in FIG. 7). When there is a plurality of second video capturing tasks for one video capturing device, the second time information determination unit 413 may determine second time information (e.g., the plurality of arrays T' as shown in FIG. 7) for each of the plurality of second video capturing tasks.

In some embodiments, when determining the second time information, the second time information determination unit 413 may directly obtain the second time information of the second plurality of video capturing devices saved by the task distributor 400. For example, each time a first video capturing task is distributed or assigned, its corresponding first time information (determined by the first time information determination unit 411) may be saved in a storage module of the task distributor 400 and be used as the second time information in the future task distribution. Alternatively, the second time information determination unit 413 may obtain the second time information from the second plurality of video capturing devices in real time. For example, when the task distributor 400 distributes or assigns a first video capturing task, the corresponding first time information may be sent to the video capturing device for storage. As another example, the second plurality of video capturing devices may record the received video capturing tasks in a recording medium (e.g., a list, a table, a queue, etc.), so that the task distributor 400 may read time parameters of the tasks from the recoding medium to determine the second time information.

Figure 10:
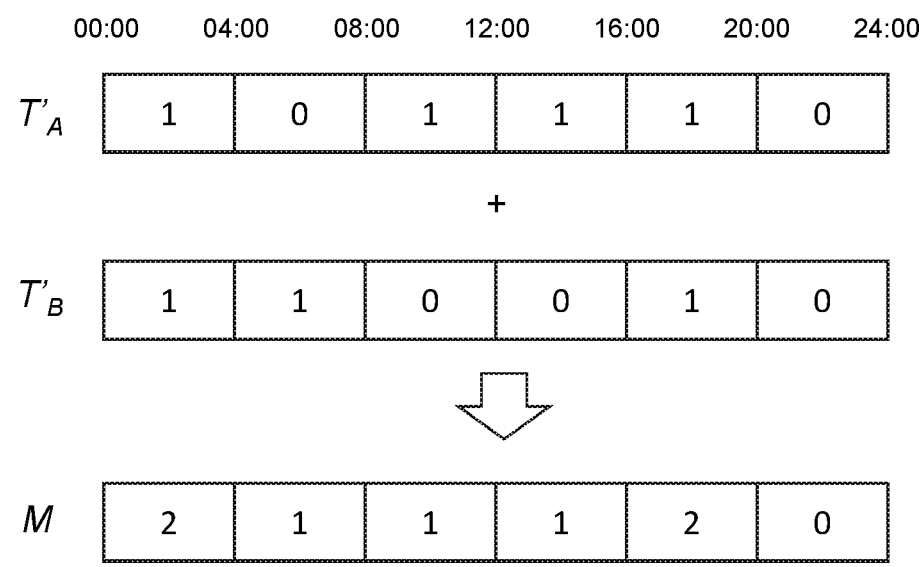
FIG. 10 is a schematic diagram illustrating an exemplary determination of an array M representing counts of tasks to be executed in parallel by a video capturing device within different time slot according to some embodiments of the present disclosure.
Figure 11:
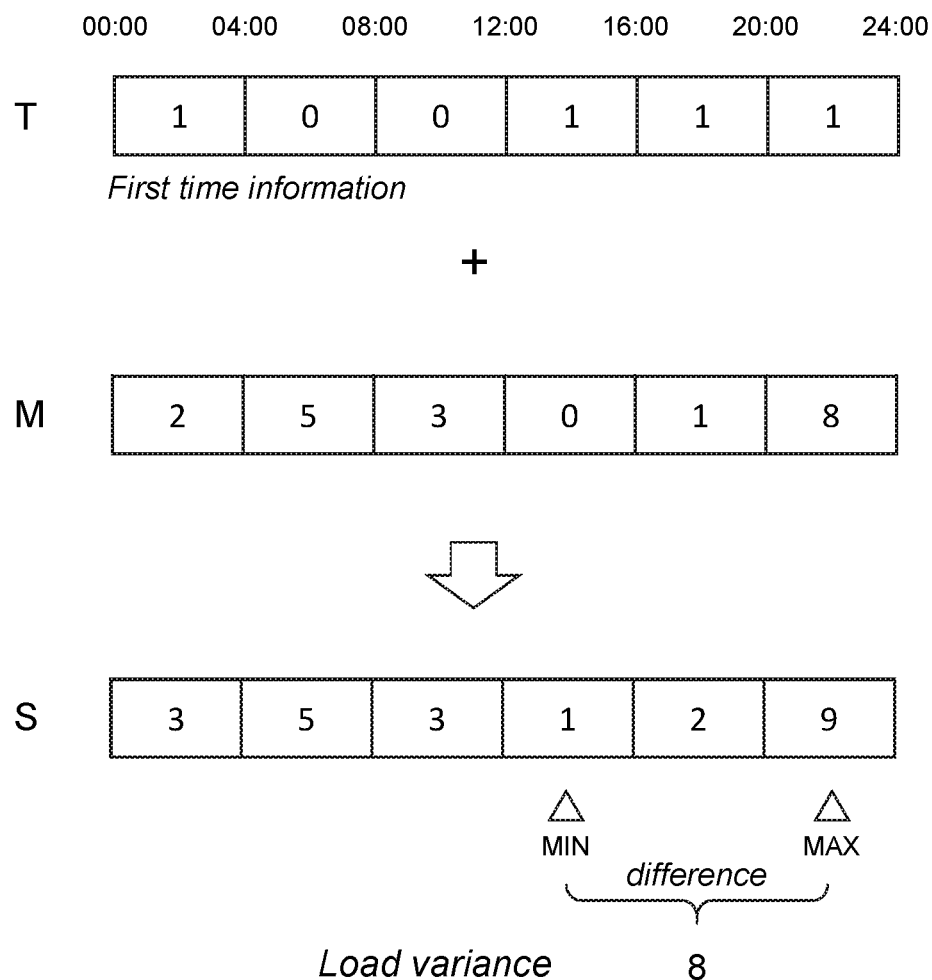
FIG. 11 is a schematic diagram illustrating an exemplary determination of the load variance according to some embodiments of the present disclosure.

In 940, the target video capturing device determination unit 414 may determine the target video capturing device from the second plurality of video capturing devices based on the first time information and the second time information. For each of the second plurality of video capturing devices, the target video capturing device determination unit 414 may determine (or estimate), based on the first time information and the second time information, a load variance of the video capturing device when the first video capturing task is assigned to the video capturing device, and may determine the target video capturing device based on the determined load variances. In some embodiments, the target video capturing device determination unit 414 may determine the load variance in a manner as shown in FIGS. 10 and 11. FIG. 10 is a schematic diagram illustrating an exemplary determination of an array M representing counts of tasks to be executed in parallel by a video capturing device within different time slot according to some embodiments of the present disclosure. FIG. 11 is a schematic diagram illustrating an exemplary determination of the load variance according to some embodiments of the present disclosure.

As shown in FIG. 10, the target video capturing device determination unit 414 may first determine, for each of the second plurality of video capturing devices based on the second time information, a count of video capturing tasks assigned to the video capturing device to be executed in parallel at or within each predetermined time point or time slot. For example, when a plurality of video capturing tasks (second video capturing tasks) have been assigned to a video capturing device, the count of the video capturing tasks to be executed in parallel by the video capturing device in a video capturing period may be determined based on the second time information of each second video capturing task. The determination result may have the form of an array M. The array M may a plurality of parameters $M_i$. A parameter $M_i$ may indicate a count of video capturing tasks to be executed by the video capturing device in parallel within or at a corresponding time slot or time point. The array M may be obtained by the target video capturing device determination unit 414 by adding the arrays T' corresponding to all the second video capturing tasks assigned to a same video capturing device. For example, for a video capturing device with two second video capturing tasks, $M=T'_A+T'_B$, where $T'_A$ and $T'_B$ represent the second time information of the two second video capturing tasks, respectively.

In some embodiments, each time a video capturing task is distributed or assigned, the task distributor 400 or the video capturing device to which the task is assigned may determine and store an array M for all the assigned tasks (including the task just assigned) of the video capturing device to which the task is assigned. When the target video capturing device determination unit 414 determines the target video capturing device at a next time, the stored array M may be directly read without further determination.

As shown in FIG. 11, the target video capturing device determination unit 414 may determine, for each of the second plurality of video capturing devices based on the array M and the array T of the first time information, a count of tasks to be executed in parallel at or within each predetermined time point or time slot when the first video capturing task is assigned to the video capturing device. The determination result may be in the form of an array S. The array S may include a plurality of parameters $S_i$. The parameter $S_i$ may indicate that, when the first video capturing task is assigned to the video capturing device, a count of video capturing tasks to be executed in parallel by the video capturing device at or within the corresponding time slot or time point. The array S may be obtained by the target video capturing device determination unit 414 adding the array M and the array T.

The target video capturing device determination unit 414 may determine a maximum value and a minimum value of the count of tasks to be executed in parallel based on the array S, and designate the difference between them as a load variance of the corresponding video capturing device.

The target video capturing device determination unit 414 may select, from the second plurality of video capturing devices, a video capturing device having a minimum load variance as the target video capturing device. Alternatively or additionally, the target video capturing device determination unit 414 may determine, from the second plurality of video capturing devices, at least one candidate video capturing device with a minimum load variance or a load variance below a certain threshold, and determine the target video capturing device from the at least one candidate video capturing device. In some embodiments, the target video capturing device determination unit 414 may select from the at least one candidate video capturing device a candidate video capturing device with a minimum count of the second video capturing tasks, a highest hardware/software configuration, a minimum resource occupation average, etc., as the target video capturing device.

In 950, the assigning module 420 may assign the first video capturing task to the target video capturing device. For example, the assigning module 420 may assign the first video capturing task to the target video capturing device via the network 150. After the assigned video capturing task is received by the target video capturing device, the target video capturing device may record the assigned video capturing task in a recording medium (e.g., a list, a table, a queue), and execute the task when the execution time point or time slot of the task is reached.

In some embodiments, the task re-distribution unit 415 (optional) may perform a re-distribution of video capturing tasks when there is an overloaded or high-loaded video capturing device in the first or second plurality of video capturing devices. The task re-distribution unit 415 may detect whether there is an overloaded or high-loaded video capturing device in the first plurality of video capturing devices in real time. When an overloaded or high-loaded video capturing device is detected or determined, the task re-distribution unit 415 may determine from a list of tasks assigned to the overloaded or high-loaded video capturing device a video capturing task that has not been executed (third video capturing task), and delete the third video capturing task from the recording medium (e.g., a list, a table, a queue), which is for recording the assigned tasks, of the overloaded or high-loaded video capturing device. The third video capturing task may be the first one of the unexecuted video capturing tasks recorded in the recording medium, the one with the highest estimated (e.g., based on the shooting parameters) resource occupation, the one requires a higher shooting quality, or the like, or a combination of them. The task re-distribution unit 415 may restart the distribution process of the third video capturing task and re-distribute the third video capturing task to the first plurality of video capturing devices (via process 900). During the task re-distribution, the video capturing devices selection unit 412 may determine, in step 920, non-overloaded or low-loaded video capturing devices whose shooting range conforms to the third video capturing task as the second plurality of video capturing devices. The re-distribution process may further enhance the load balance of the first plurality of video capturing devices.

It may be noted that the above descriptions of distributing video capturing tasks are only for demonstration purposes and not intended to be limiting. It is to be understood that, after learning the major concept and the mechanism of the present disclosure, a person of ordinary skill in the art may alter process 900 in an uncreative manner. For example, the operations above may be implemented in an order different from that illustrated in FIG. 9. One or more optional operations may be added to process 900. One or more operations may be split or be combined. All such modifications are within the protection range of the present disclosure.

In some embodiments, when being performed by the video cloud storage system 800 as illustrated in FIG. 8, process 900 may be implemented by process 1200 illustrated in FIG. 12.

{{FIG. 12}}

FIG. 12 is a schematic diagram illustrating an exemplary task distribution process performed by the system illustrated in FIG. 8 according to some embodiments of the present disclosure. Process 1200 may be performed by the task distributor 400 to achieve the process 900 illustrated in FIG. 9. In some embodiments, one or more operations of process 1200 may be implemented in the video capturing system 800 illustrated in FIG. 8. For example, the illustrated process 1200 may be stored in a storage module of the managing server 810 in the form of instructions, and invoked and/or executed by the managing server 810 or the task distributor 400. One or more operations of the process 1200 may be performed by the processor 310 of the computing device 300 as illustrated in FIG. 3 which implements the managing server 810 or the task distributor 400. The process 1200 may include:

Step 1210: the management server 810 (or task distributor 400) may determine first time information for a first video capturing task to be distributed (first video capturing task) and second time information for at least one second video capturing task assigned to each of a second plurality of node servers, wherein the first and second time information may be used to inform the node server with the time (time point or time slot) to execute the video capturing task. Step 1210 may be performed to achieve steps 910 and 930 of process 900 illustrated in FIG. 9.

The video capturing tasks may be classified into two categories. The first category may be planned video capturing tasks. A planned video capturing tasks may be executed according to a fixed video capturing period (e.g., a week, a day, etc.) predetermined by the system. During each video capturing period, the video capturing task may direct the node server to execute the video capturing task at any planned time point or time slot, and not to execute the video capturing task at any other time. The second category may be provisional video capturing tasks. A provisional video capturing task may direct the node server to keep executing video capturing task within a specified time slot, and not to execute the video capturing task at a time other that the specified time slot.

In some embodiments, the management server 810 (or task distributor 400) may perform the following steps before performing step 201:

Step A1: the management server 810 (or the video capturing devices selection unit 412) may obtain a task-count threshold; and Step A2: the management server 810 (or the video capturing devices selection unit 412) may select, from a plurality of node servers under its management (first plurality of node servers), the second plurality of node servers, each of which has a count of second video capturing tasks less than the task-count threshold, wherein each node server may store the count of video capturing tasks assigned thereto (second video capturing tasks).

Steps A1 and A2 may be performed to achieve step 920 of process 900 illustrated in FIG. 9.

In the above process, as the counts of the second video capturing tasks of the second plurality of node servers selected by the management server 810 is smaller than the task-count threshold, some node servers with higher workload may be excluded from the subsequent task distribution performed by the management server 810, so that that the node servers with lower workload may get a priority on the task distribution, and the load may be balanced among the node servers.

In some embodiments, in step A1, the management server 810 (or the video capturing devices selection unit 412) may obtain the task-count threshold in a process as following:

The management server 810 (or the video capturing devices selection unit 412) may determine a minimum value and an average value of the counts of the video capturing tasks assigned to each of the first plurality of node servers. The management server 810 (or the video capturing devices selection unit 412) may calculate a product of the average value and a preset weight (e.g., 20%), and add the minimum value with the product to obtain the task count threshold.

For example, there may be five node servers. A count of the second video capturing tasks of the node servers 1 to 5 may be 4, 5, 6, 7, and 8, respectively. The preset weight may be 20%. When determining the task count threshold, the management server 810 (or the video capturing devices selection unit 412) may determine that the minimum value is 4 and the average value of 4, 5, 6, 7, and 8 is 6. The management server 810 (or the video capturing devices selection unit 412) may determine that a product of the minimum value 4 and the preset weight 20% is 1.2, and then add the minimum value 4 with the product 1.2 to obtain the task-count threshold, which is 5.2. After obtaining the task-count threshold 5.2, the management server 810 (or the video capturing devices selection unit 412) may select the node server 1 and the node server 2, of which the count of the second video capturing tasks is smaller than 5.2, from the five node servers as the second plurality of node servers. Thus, when the management server 810 distributes a video capturing task, node servers 3 to 5 with higher loads may be excluded from the task distribution, so that node servers 1 and 2 with lower loads may get priorities on the task distribution, and the load may be balanced among the five node servers.

In some embodiments, when determining the first time information, the management server 810 (or the first time information determination unit 411) may determine at or within which time point(s) or time slot(s) the first video capturing task may be executed by the node server.

In some embodiments, when determining the second time information, the management server 810 (or the second time information determination unit 413) may obtain the second time information stored in the management server 810, or obtain the second time information in real time from the second plurality of server nodes.

The first time information and the second time information may be represented by an array T (e.g., as shown in FIG. 6). The array T may include a plurality of $T_i$. When the video capturing task is to be executed within a corresponding time slot, $T_i$ is 1. When the video capturing task is not to be executed within a corresponding time slot, $T_i$ is 0. For example, when the video capturing period is one day (24 h), the video capturing period may be equally divided into six time slots (in a unit of four hours, for example, as shown in FIG. 6). The time information of the video recording task may be expressed as $(T_1, T_2, T_3, T_4, T_5, T_6)$. If the video capturing task is to be executed within the first time slot, the third time slot, the fourth time slot and the sixth time slot, the above array T is (1,0,1,1,0,1)

It may be noted that, the time sections or the array T may also be configured by equally dividing the video capturing period (e.g., 24 h) into seconds, minutes, or hours according to the application scenario. The six-membered array T is only for demonstration purposes and not intended to be limiting.

Step 1220: the management server 810 (or the task distributor 400) may determine, from the second plurality of node servers, a target node server based on the first time information and the second time information. Step 1220 may be performed to achieve step 940 of process 900 illustrated in FIG. 9.

In some embodiments, the management server 810 may perform step 1220 in a process as follows:

Step B1: for each of the second plurality of node servers, the management server 810 (or the target video capturing device determination unit 400) may estimate, based on the first time information and the second time information, a load variance of the node server when the first video capturing task is assigned to the node server. The load variance may be a difference between a count of video capturing tasks to be executed by the node server at a first time and a count of video capturing tasks to be executed by the node server at a second time. The first time may be a time when the count of video capturing tasks to be executed in parallel by the node server reaches its maximum, and the second time is a time when the count of video capturing tasks to be executed in parallel by the node server reaches its minimum.

Step B2: the management server 810 (or the target video capturing device determination unit 400) may select at least one candidate node server with a minimum load variance among the second plurality of node servers.

Step B3: the management server 810 (or the target video capturing device determination unit 400) may determine the target node server from the at least one second node server.

In some embodiments, the management server 810 (or the target video capturing device determination unit 400) may perform step B1 in a process as follows (e.g., as illustrated in FIG. 11).

The management server 810 (or the target video capturing device determination unit 400) may first determine, based on the first time information, the execution time point or time period of the first video capturing task. The first time information of the first video capturing task may be in the form of the array T, such as T (1, 0, 0, 1, 1, 1). For each of the second plurality of node servers, the management server 810 (or the target video capturing device determination unit 400) may determine, based on the second time information of the node server, a count of the video capturing tasks to be executed in parallel by the node server, which may be in the form of the array M.

As described earlier, when a plurality of video capturing tasks (second video capturing tasks) have been assigned to a node server, based on the second time information of each second video capturing task, a count of video capturing tasks to be executed in parallel by the node server in the video capture period may be determined, for example, in the form of the array M. The array M may correspond to the array T. For example, the array M may include a plurality of M, which may represent a count of video capturing tasks to be executed by the node server in parallel within or at the corresponding time slot or time point. In some embodiments, the array M may be obtained by adding the arrays T' corresponding to the second video capturing tasks.

For example, as shown in FIG. 10, a node server may be assigned with a second video capturing task 1 and a second video capturing task 2. An array $T'_A$ corresponding to the second video capturing task 1 may be (1, 0, 1, 1, 1, 0), and an array $T'_B$ corresponding to the second video capturing task 2 is (1, 1, 0, 0, 1, 0). By performing the calculation $T'_A$ (1,0,1,1,1,0)+$T'_B$ (1,1,0,0,0,1)=(2,1,1,1,2,0), the management server 810 (or the target video capturing device determination unit 414) may obtain an array M (2, 1, 1, 1, 2, 0) indicating the count of video capturing tasks to be executed in parallel by the node server. The array M may represent that the counts of video capturing tasks to be executed in parallel from the first time slot to the sixth time slot is 2, 1, 1, 1, 2, 0, respectively.

In some embodiments, the management server 810 may store an array M for each node server. For example, each time a first video capturing task is assigned, the management server 810 (or the task distributor 400) may update the stored array M of the node server being assigned with the first video capturing task. Alternatively, for each of the second plurality of node servers, the management server 810 (or the task distributor 400) may acquire the second time information of the node server in real time, and determine the array M of the node server based on the obtained second time information. For example, when distributing the first video capturing task, for each of the second plurality of node servers, the management server 810 may obtain a list for recording the assigned tasks from the node server, and determine a corresponding array M in real time based on the list.

For each of the second plurality of node servers, the management server 810 (or the target video capturing device determination unit 414) may perform a process as following:

Step C1: the management server 810 (or the target video capturing device determining unit 414) may estimate the load variance of the node server when the first video capturing task is assigned to the node server. The management server 810 (or the target video capturing device determination unit 414) may add the array M of the node server and the array T corresponding to the first video capturing task to obtain an array S indicating the count of the video capturing tasks to be executed in parallel by the node server when the first video capturing task is assigned to the node server. The array S may include a plurality of $S_i$, which may indicate the count of video capturing tasks, within or at a corresponding time slot or time point, to be executed in parallel by the node server after receiving the first video capturing task. For example, as shown in FIG. 11, the array M of the node server may be (2, 5, 3, 0, 1, 8). The array M may be added with the array T corresponding to the first video capturing task via the calculation (2, 5, 3, 0, 1, 8)+(1, 0, 0, 1, 1, 1)=(2+1, 5+0, 3+0, 0+1, 1+1, 8+1)=(3, 5, 3, 1, 2, 9) to obtain an array S (3, 5, 3, 1, 2, 9) indicating the count of video capturing tasks to be executed in parallel by the node server.

Step C2: the management server 810 (or the target video capturing device determining unit 414) may determine, based on the array S of the node server, a first time slot (or time point) when the count of the video capturing tasks to be executed in parallel by the node server reaches its maximum and a second time slot (or time point) when the count of the video capturing tasks to be executed in parallel by the node server reaches its minimum.

Step C3: the management server 810 (or the target video capturing device determining unit 414) may calculate a difference between the counts of the video capturing tasks to be executed in parallel by the node server within the first time slot and within the second time to obtain the load variance of the node server.

In some embodiments, when there is only one candidate node server determined in step B2, the management server 810 (or the target video capturing device determining unit 414) may directly designate the node server as the target node server in step B3. When there are more than one candidate node servers determined in step B2, then in step B3, the management server 810 (or the target video capturing device determining unit 414) may select the target node server from the candidate node servers using a load balancing approach. For example, a candidate node server with a minimum count of second video capturing tasks may be determined as the target node server.

In some embodiments, in the above approach, if the management server 810 (or the target video capturing device determining unit 414) determines more than one candidate node servers with a minimum count of second video capturing tasks from the candidate node servers, the management server 810 (or the target video capturing device determining unit 414) may continue to select the target node server from the candidate node servers using other load balancing approaches. For example, a candidate node server with the best performance or that is most convenient to be managed by the management server 810 may be selected as the target node server.

Step 203: the management server 810 (or the task distributor 400) may assign the first video capturing task to the target node server (e.g., via the assigning module 420).

In some embodiments, when a video capturing task in a node server is not to be executed or is to be removed, the management server 810 may remove, based on the time information (e.g., second time information) stored in the management server 810 or the node server, the video capturing task from a list for recording the assigned video capturing tasks of the node server, and update the array M corresponding to the node sever.

For example, if the video capturing task 6 assigned to the node server 6 is to be removed, the management server 810 may determine an array T corresponding to the video capturing task 6, and then subtract the array T from the array M corresponding to the node server 6, so that the array M corresponding to the node sever 6 may be updated and stored.

Via the above task removing process, the video capturing tasks that are not needed or not to be executed may be removed in time, and therefore the load of the node servers may be reduced.

In some embodiments, when determining that a node server is overloaded or high-loaded, the management server 810 (or the task re-distribution unit 415) may determine a video capturing task that is unneeded or haven't been executed (third video capturing task). The management server 810 (or the task re-distribution unit 415) may remove the third video capturing task from the node server (e.g., via the above task removing process), and re-distribute the third video capturing task to other node servers (e.g., via process 1200) for load balancing (e.g., via the task re-distribution unit 415).

Via the above task re-distribution process, video capturing tasks in the overloaded or high-loaded node server may be distributed to other node servers, taking the load of each node server into consideration, thus the workload of the node servers may be balanced.

Having thus described the basic concepts, it may be rather apparent to those skilled in the art after reading this detailed disclosure that the foregoing detailed disclosure may be intended to be presented by way of example only and may be not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment may be included in at least one embodiment of the present disclosure. Therefore, it may be emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that may be not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2103, Perl, COBOL 2102, PHP, ABAP, dynamic programming languages such as Python, Ruby, and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, may be not intended to limit the claimed processes and methods to any order except as may be specified in the claims. Although the above disclosure discusses through various examples what may be currently considered to be a variety of useful embodiments of the disclosure, it may be to be understood that such detail may be solely for that purposes, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, for example, an installation on an existing server or mobile device.

Similarly, it should be appreciated that in the foregoing description of embodiments of the present disclosure, various features are sometimes grouped together in a single embodiment, figure, or description thereof for the purposes of streamlining the disclosure aiding in the understanding of one or more of the various inventive embodiments. This method of disclosure, however, may be not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein may be hereby incorporated herein by this reference in its entirety for all purposes, excepting any prosecution file history associated with same, any of same that may be inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and describe.

I claim:

1. A system, comprising:
a first plurality of video capturing devices, each of which being configured to obtain a video when executing a video capturing task, the first plurality of video capturing devices including a plurality of first video capturing devices; and
one or more task distributors, configured to distribute video capturing tasks to the first plurality of video capturing devices,
wherein during operation, the one or more task distributors are configured to:
  determine first time information related to when a first video capturing task is to be executed;
  determine a second plurality of video capturing devices from the first plurality of video capturing devices to distribute the first video capturing task, the second plurality of video capturing devices including a plurality of second video capturing devices;
  for each of the second plurality of video capturing devices:
    determine second time information related to when at least one second video capturing task is to be executed by the second video capturing device;
    determine, based on the first time information and the second time information, a load variance of the second video capturing device when the first video capturing task is assigned to the second video capturing device, wherein the load variance is measured by a difference between a maximum workload and a minimum workload to be executed by the second video capturing device within a given time period;
  determine, based on the load variances of the second plurality of video capturing devices, a target video capturing device from the second plurality of video capturing devices; and assign the first video capturing task to the target video capturing device.

2. The system of claim 1, wherein to determine a target video capturing device from the second plurality of video capturing devices based on the load variances of the second plurality of video capturing devices,
determine at least one candidate video capturing device with a minimum load variance from the second plurality of video capturing devices; and
determine the target video capturing device from the at least one candidate video capturing device.

3. The system of claim 1, wherein to determine the load variance of the second video capturing device, the one or more task distributors are configured to:
determine, based on the first time information and the second time information, a count of video capturing tasks to be executed in parallel by the second video capturing device in each of a plurality of time slots or time points during the given time period;
determine, among the counts corresponding to the plurality of time slots or time points, a maximum count of the video capturing tasks to be executed in parallel by the second video capturing device;
determine, among the counts corresponding to the plurality of time slots or time points, a minimum count of the video capturing tasks to be executed in parallel by the second video capturing device; and
determine a count difference between the maximum count and the minimum count as the load variance of the second video capturing device.

4. The system of claim 2, wherein to determine the target video capturing device from the at least one candidate video capturing device, the one or more task distributors are configured to:
for each of the at least one candidate video capturing device, determine a count of second video capturing tasks that have been assigned to the candidate video capturing device;
determine, from the at least one count corresponding to the at least one candidate video capturing device, a minimum count of second video capturing tasks: and
select, from the at least one candidate video capturing device, a candidate video capturing device with the minimum count of second video capturing tasks as the target video capturing device.

5. The system of claim 1, wherein to determine the second plurality of video capturing devices, the one or more task distributors are configured to:
obtain a task-count threshold;
for each of the first plurality of video capturing devices:
determine a first count of assigned video capturing tasks of the first video capturing device; and
select the first video capturing device as one of the second plurality of video capturing devices when the first count of the first video capturing device is less than the task-count threshold.

6. The system of claim 5, wherein to determine the task-count threshold, the one or more task distributors are configured to:
determine a minimum value and an average value of the first counts; and
determine a weighted sum of the minimum value and the average value as the task-count threshold.

7. The system of claim 1, comprising a video capturing network, wherein:

each one of the first plurality of video capturing devices includes a node server in the video capturing network; and
when executing a video capturing task, the node server directs at least one camera to capture a video.

8. The system of claim 1, wherein the one or more task distributors are configured to:
determine an overloaded or high-loaded video capturing device from the first plurality of video capturing devices;
determine from a list of tasks assigned to the overloaded video capturing
device a third video capturing task that has not been executed, wherein the third video capturing task has a highest estimated resources usage among all the video capturing tasks that has not been executed;
remove the third video capturing task from the list of the overloaded or high-loaded video capturing device; and
re-distribute the third video capturing task to the first plurality of video capturing devices.

9. The system of claim 1, further comprising:
at least one terminal, configured to communicate with a network and generate the first video capturing task, wherein the one or more task distributors further receive the first video capturing task from the at least one terminal via the network.

10. The system of claim 9, wherein the target video capturing device is further configured to transmit a video obtained by executing the first video capturing task to the at least one terminal via the network.

11. The system of claim 9, further comprising:
a storage device, configured to communicate with the network, wherein:
the target video capturing device is further configured to transmit a video obtained by executing the first video capturing task to the storage device via the network; and
the at least one terminal is further configured to obtain the video from the storage device via the network.

12. A method for balancing loads during a distribution of a video capturing task, comprising:
determining, by a task distributor, first time information related to when a first video capturing task is to be executed;
determining, by the task distributor, a second plurality of video capturing devices from a first plurality of video capturing devices to distribute the first video capturing task, wherein each of the first plurality of video capturing devices is configured to obtain a video when executing a video capturing task, the first plurality of video capturing devices including a plurality of first video capturing devices, the second plurality of video capturing devices including a plurality of second video capturing devices;
for each of the second plurality of video capturing devices:
determining, by the task distributor, second time information related to when at least one second video capturing task is to be executed by the second video capturing device;
determining, by the task distributor based on the first time information and the second time information, a load variance of the second video capturing device when the first video capturing task is assigned to the second video capturing device, wherein the load variance is measured by a difference between a maximum workload and a minimum workload to be executed by the second video capturing device within a given time period;

determining based on the load variances of the second plurality of video capturing devices. a target video capturing device from the second plurality of video capturing devices; and assigning, by the task distributor, the first video capturing task to the target video capturing device.

13. The method of claim 1, wherein the determining the target video capturing device from the second plurality of video capturing devices based on the load variances of the second plurality of video capturing devices comprises:

determining at least one candidate video capturing device with a minimum load variance from the second plurality of video capturing devices; and determining the target video capturing device from the at least one candidate video capturing device.

14. The method of claim 12 wherein the determining the load variance of the second video capturing device comprises:

determining, based on the first time information and the second time information, a count of video capturing tasks to be executed in parallel by the second video capturing device in each of a plurality of time slots or time points during the given time period;

determining, among the counts corresponding to the plurality of time slots or time points, a maximum count of the video capturing tasks to be executed in parallel by the second video capturing device;

determining, among the counts corresponding to the plurality of time slots or time points, a minimum count of the video capturing tasks to be executed in parallel by the second video capturing device; and determining a count difference between the maximum count and the minimum count as the load variance of the second video capturing device.

15. The method of claim 13, wherein the determining the target video capturing device from the at least one candidate video capturing device comprises:

for each of the at least one candidate video capturing device, determining a count of second video capturing tasks that have been assigned to the candidate video capturing device;

determining from the at least one count corresponding to the at least one candidate video capturing device. a minimum count of second video capturing tasks; and selecting, the at least one candidate video capturing device, a candidate video capturing device with-a the minimum count of second video capturing tasks as the target video capturing device.

16. The method of claim 12, wherein the determining the second plurality of video capturing devices comprises:

obtaining a task-count threshold;

for each of the first plurality of video capturing devices:

determining a first count of assigned video capturing tasks of the first video capturing device; and selecting the first video capturing device as one of the second plurality of video capturing devices when the first count of the first video capturing device is less than the task-count threshold.

17. The method of claim 16, wherein the determining the task-count threshold comprises:

determining a minimum value and an average value of the first counts; and determining a weighted sum of the minimum value and the average value as the task-count threshold.

18. The method of claim 12, further comprising:

determining an overloaded or high-loaded video capturing device from the first plurality of video capturing devices;

determining from a list of tasks assigned to the overloaded or high-loaded video capturing device a third video capturing task that has not been executed, wherein the third video capturing task has a highest estimated resources usage among all the video capturing tasks that has not been executed;

removing the third video capturing task from the list of the overloaded or high-loaded video capturing device; and re-distributing the third video capturing task to the first plurality of video capturing devices.

19. A non-transitory computer readable medium, storing instructions, the instructions when executed by a processor, causing the processor to execute operations comprising:

determining first time information related to when a first video capturing task is to be executed;

determining a second plurality of video capturing devices from a first plurality of video capturing devices to distribute the first video capturing task, wherein each of the first plurality of video capturing devices is configured to obtain a video when executing a video capturing task, the first plurality of video capturing devices including a plurality of first video capturing devices, the second plurality of video capturing devices including a plurality of second video capturing devices;

for each of the second plurality of video capturing devices:

determining second time information related to when at least one second video capturing task is to be executed by the second video capturing device;

determining, based on the first time information and the second time information, a load variance of the second video capturing device when the first video capturing task is assigned to the second video capturing device, wherein the load variance is measured by a difference between a maximum workload and a minimum workload to be executed by the second video capturing device within a given time period;

determining, based on the load variances of the second plurality of video capturing devices, a target video capturing device from the second plurality of video capturing devices; and assigning the first video capturing task to the target video capturing device.

20. The method of claim 12, further comprising:

communicating, by at least one terminal, with a network and generating the first video capturing task, wherein the one or more task distributors further receive the first video capturing task from the at least one terminal via the network.

* * * * *